United States Patent
Kajitani et al.

(10) Patent No.: US 7,651,804 B2
(45) Date of Patent: Jan. 26, 2010

(54) FUEL CARTRIDGE FOR FUEL CELL AND FUEL CELL WITH THE FUEL CARTRIDGE

(75) Inventors: Hiroshi Kajitani, Tokyo (JP); Hidekazu Kimura, Tokyo (JP); Takashi Manako, Tokyo (JP); Tsutomu Yoshitake, Tokyo (JP); Yoshimi Kubo, Tokyo (JP)

(73) Assignee: NEC Corporation, Tokyo (JP)

( * ) Notice: Subject to any disclaimer, the term of this patent is extended or adjusted under 35 U.S.C. 154(b) by 65 days.

(21) Appl. No.: 10/578,353

(22) PCT Filed: Nov. 8, 2004

(86) PCT No.: PCT/JP2004/016527

§ 371 (c)(1),
(2), (4) Date: May 5, 2006

(87) PCT Pub. No.: WO2005/045975

PCT Pub. Date: May 19, 2005

(65) Prior Publication Data

US 2007/0104995 A1      May 10, 2007

(30) Foreign Application Priority Data

Nov. 6, 2003   (JP)   .............................. 2003-377104

(51) Int. Cl.
  *H01M 8/04*   (2006.01)
  *H01M 2/14*   (2006.01)
  *H01M 2/00*   (2006.01)
  *B65D 6/00*   (2006.01)

(52) U.S. Cl. .............................. 429/34; 429/38; 429/39; 220/4.12

(58) Field of Classification Search .................. 429/34, 429/38, 39; 220/4.12
See application file for complete search history.

(56) References Cited

U.S. PATENT DOCUMENTS

| | | | |
|---|---|---|---|
| 7,270,907 B2 * | 9/2007 | Becerra et al. | 429/34 |
| 2003/0082427 A1 | 5/2003 | Prasad et al. | |
| 2003/0138679 A1 * | 7/2003 | Prased et al. | 429/19 |
| 2003/0207158 A1 * | 11/2003 | Bullock et al. | 429/12 |
| 2005/0058880 A1 * | 3/2005 | Fujita et al. | 429/38 |
| 2005/0079128 A1 * | 4/2005 | deVos et al. | 423/658.2 |
| 2006/0204814 A1 * | 9/2006 | Sekino et al. | 429/34 |

FOREIGN PATENT DOCUMENTS

| | | | |
|---|---|---|---|
| JP | 11-510311 | | 9/1999 |
| JP | 2003-203660 | | 7/2003 |
| JP | 2003-223243 | | 8/2003 |
| JP | 2003-257466 | * | 9/2003 |
| JP | 2003-297401 | | 10/2003 |
| JP | 2003-331880 | | 11/2003 |
| JP | 2004-265787 | * | 9/2004 |
| JP | 2004-296135 | * | 10/2004 |

* cited by examiner

Primary Examiner—Patrick Ryan
Assistant Examiner—Angela J. Martin
(74) Attorney, Agent, or Firm—Young & Thompson

(57) ABSTRACT

A fuel cartridge in a fuel cell is constructed so as to be removably mounted to a fuel cell body. The fuel cartridge is constructed so that a high-concentration fuel tank and a mixing tank are detachably connected at a fitting section. A low-concentration fuel, a recovered fuel recovered from a fuel container, and a high-concentration fuel in the high-concentration fuel tank are mixed in the mixing tank to be a fuel at a predetermined concentration of fuel component, and then the fuel is supplied to the fuel container.

20 Claims, 17 Drawing Sheets vacant space only low-concentration fuel 1149 remains low-concentration fuel 1149 and high-concentration fuel 725 remain

FUEL CARTRIDGE FOR FUEL CELL AND FUEL CELL WITH THE FUEL CARTRIDGE

BACKGROUND OF THE INVENTION

1. Field of the Invention

The present invention relates to a fuel cartridge for a fuel cell and a fuel cell with the fuel cartridge.

2. Description of the Related Art

With the advent of recent information society, the amount of information processed in an electronic device, e.g., a personal computer, dramatically increases, and power consumption in the electronic device has remarkably increased due to the increase of the amount of information. Particularly, in a portable electronic device, the increase in power consumption because of the increase in processing capacity presents a problem. Currently, in such a portable electronic device, a lithium-ion battery is generally used as a power source, and the energy density of the lithium-ion battery has been close to the theoretical limit. Therefore, there is a constraint that the drive frequency of CPU (central processing unit) must be controlled to reduce the power consumption in order to extend the continuous use period of the portable electronic device.

Under these circumstances, a fuel cell with a high energy density and a high heat exchange rate is used as a power source instead of the lithium-ion battery with the expectation that the continuous use period of the portable electronic device will be improved substantially.

The fuel cell is composed of a fuel pole, an oxidizer pole (hereinafter, these are also called "catalyst electrodes"), and an electrolyte between these poles. Fuel is supplied to the fuel pole and an oxidizer is supplied to the oxidizer pole to generate electric power by an electrochemical reaction. Hydrogen is generally used as the fuel. However, recently, by using methanol that is inexpensive and is handled easily as a raw material, a methanol reforming type fuel cell, in which methanol is reformed to generate hydrogen, and a direct type fuel cell, in which methanol is directly used as fuel, are being actively developed.

When hydrogen is used as the fuel, the reaction at the fuel pole is represented by the following equation (1).

$$3H_2 \rightarrow 6H^+ + 6e^- \quad (1)$$

When methanol is used as the fuel, the reaction at the fuel pole is represented by the following equation (2).

$$CH_3OH + H_2O \rightarrow 6H^+ + CO_2 + 6e^{31} \quad (2)$$

Also, in both cases, the reaction at the oxidizer pole is represented by the following equation (3).

$$3/2O_2 + 6H^+ + 6e^- \rightarrow 3H_2O \quad (3)$$

Particularly, in the direct type fuel cell, since hydrogen ions can be obtained from a methanol aqueous solution, no device for reforming or the like is required, and there is a big advantage in applying this to a portable electronic device. Further, since a liquid methanol aqueous solution is used as the fuel, direct type fuel cell has an advantage that the energy density is exceedingly high.

In such a liquid fuel supply type fuel cell, preferably, concentration of the fuel component is high in the liquid to be supplied to the fuel pole, in terms of putting the fuel cell to use for an extended period.

However, when organic liquid fuel, such as methanol, that has a high affinity for water is used, according as the concentration of the fuel component becomes higher, a crossover in which the fuel component is diffused in a solid electrolyte film including water to reach the oxidizer pole is more apt to occur. The crossover causes lowering in voltage and output and reduction in fuel efficiency, because the organic liquid fuel that should provide electrons at the fuel pole is oxidized at the oxidizer pole side and is not used effectively as the fuel. Therefore, it is difficult to increase the concentration of fuel component in the liquid to be supplied to the fuel pole.

So, there is proposed a fuel cell including a fuel tank which contains high-concentration methanol and a mixing tank used to dilute the methanol in the fuel tank with water (Japanese Patent Laid-open No. 2003-223243). This conventional art adopts an arrangement in which water generated by the reaction of the above-mentioned equation (3) is introduced to the mixing tank in order to dilute the high-concentration methanol and then diluted methanol is supplied to the fuel cell, in a fuel cell used in a notebook type personal computer.

However, this arrangement has room for improvement in regard to stable supply of liquid fuel at a predetermined concentration of fuel component to the fuel cell. Also, since a mechanism for introducing water generated at the oxidizer pole into the mixing tank is required, the device arrangement is complex.

SUMMARY OF THE INVENTION

In view of the above problems, the object of the present invention is to provide a technique for stably supplying liquid fuel at a predetermined concentration to a fuel cell.

The present invention provides a fuel cartridge for a fuel cell, comprising a first chamber for retaining first liquid fuel, a second chamber for retaining second liquid fuel, a partition wall for partitioning the first chamber and the second chamber, and a mounting section to be fixed to a fuel cell body, wherein the second chamber is provided with a fuel outlet port through which the second liquid fuel passes to the fuel cell body.

Since the fuel cartridge for the fuel cell is provided with a mounting section, the fuel cartridge can be detachably mounted to the fuel cell body. Therefore, the fuel cartridge can be easily exchanged for a new one, when the liquid in the first chamber or the second chamber is completely used up. Further, since the fuel outlet port is arranged in the second chamber, the liquid in the second chamber can be stably supplied to the fuel cell body. Also, since the fuel cartridge for the fuel cell is provided with a first chamber and a second chamber and since these chambers are partitioned by the partition wall, these chambers can accommodate fuels each having different concentrations. Moreover, two kinds of fuels each having different concentrations can be used, and when the concentrations of these fuels are known, the concentration of fuel to be supplied to the fuel cell body can be stably controlled. As a result, the liquid fuel with the desirable concentration can be stably supplied to the fuel cell body.

In the fuel cartridge for the fuel cell, an outlet port may be further arranged in the first chamber. With this arrangement, the first liquid fuel and the second liquid fuel can be certainly supplied to the fuel cell body. Therefore, fuel at a predetermined concentration can be stably supplied to the fuel cell body.

The fuel cartridge for the fuel cell according to the present invention accommodates two kinds of fuels having different concentrations each other, i.e., the first liquid fuel and the second liquid fuel. Therefore, the level of the concentration of liquid fuel to be supplied to the fuel cell body is the same as the level of the concentration of first liquid fuel or the level of the concentration of second liquid fuel. However, the output characteristic may vary when the fuel cell body is in operation. For this reason, it is preferable that the concentration of liquid fuel to be supplied to the fuel cell body can be adjusted to a desirable concentration so that the fuel cell can be operated more stably.

In the fuel cartridge for the fuel cell according to the present invention, the second chamber may further include a fuel inlet port to which the first liquid fuel that is supplied from the fuel outlet port in the first chamber is introduced. With this arrangement, the first liquid fuel can be introduced into the second chamber. Therefore, the first liquid fuel can be added to the second liquid fuel in the second chamber, and fuel in the second camber can be adjusted to a desirable concentration. Accordingly, fuel with the desirable concentration can be stably supplied.

In the fuel cartridge for the fuel cell according to the present invention, the second chamber may be a fuel-mixing tank for mixing the first liquid fuel and the second liquid fuel. With this arrangement, after the first liquid fuel and the second liquid fuel are mixed in the fuel-mixing tank, the mixed fuel can be supplied to the fuel cell body. Accordingly, fuel with the desirable concentration can be more stably supplied.

In the fuel cartridge for the fuel cell according to the present invention, the first liquid fuel and the second liquid fuel may be different in color. With this arrangement, by seeing the differences in color, the concentration and the remaining amount of the first liquid fuel or the second liquid fuel can be easily determined.

Also, the fuel cartridge for the fuel cell according to the present invention can accommodate two fuels each having different concentrations, i.e., the first liquid fuel and the second liquid fuel. When such a fuel cartridge for the fuel cell is used, the rate of consumption of the first liquid fuel and the second liquid fuel may be different. Therefore, it is preferable to avoid the need to change a cartridge in a situation in which one of the different liquid fuels still remains in the fuel cartridge. Then, in order to solve this problem and to enable the liquid fuel at a desired concentration to be more stably supplied to the fuel cell body, the fuel cartridge for the fuel cell according to the present invention may include a first container that has a first chamber and a second container that has a second chamber and that is removably mountable on the first container. With this arrangement, these containers can be exchanged of different times in accordance with consumption of the contents of each container. Therefore, the efficiency in use of fuel can be improved. Further, there is no need to provide a mechanism in the fuel cell body for recovering water generated at the oxidizer pole. Also, no condenser for condensing the recovered water is needed. Therefore, the structure of the fuel cell body can be simplified. As a result, such a fuel cartridge can be suitably used for the fuel cell that is used in a portable device.

The fuel cartridge for the fuel cell according to the present invention may further include a fitting section in which the first container and the second container are fitted each other. With this arrangement, the first container and the second container can be made reliably attachable and detachable using a simple structure.

The fuel cartridge for the fuel cell according to the present invention may further include a cover member for covering the fuel outlet port, and the cover member may be formed into a removable sheet. With this arrangement, the liquid fuel can be prevented from leaking prior to use. Also, the seal is removed when used, and thus the liquid fuel can be supplied to the fuel cell body.

The fuel cartridge for the fuel cell according to the present invention may further include a cover member for covering the fuel outlet port, and the cover member may be an elastic member with a self-sealing characteristic. Incidentally, in this description, the self-sealing characteristic is a characteristic that, when it is pierced by a pointed penetrating member, like a needle, the penetrating member and the periphery thereof are hermetically sealed in the pierced portion. A representative example is an elastic member made of rubber, such as a septum made of silicon rubber, a reseal made of ethylene-propylene rubber, and so on. The elastic member generates plastic deformation when pierced by a pointed member, like a needle, and the pointed member and the periphery thereof are hermetically sealed suitably. The covering member is made of the elastic member having the self-sealing characteristic, the penetrating member and the covering member are in contact in the pierced portion during use and thus liquid fuel can be prevented from leaking. Therefore, the fuel cell can be safely operated. When it is expected a portion will be pierced, at least the portion to be pierced and the periphery thereof may be made of the elastic member and the self-sealing function will operate. A silt may be previously formed in the portion to be pierced, and a lubricant, such as silicon oil, may be applied to the side wall of the silt.

In the fuel cartridge for the fuel cell according to the present invention, it is preferable that the remaining amount of the first liquid fuel or the second liquid fuel can be detected, so that new fuel cartridges can be exchanged for cartridges in which the liquid fuel has been completely used up. Preferably, the fuel cartridge for the fuel cell according to the present invention includes a detection window, that is arranged in the first chamber or in the second chamber, for detecting the level of the liquid surface of the first liquid fuel or the liquid surface of the second liquid fuel from the outside. With this arrangement, the level of the liquid surface of the first liquid fuel or the liquid surface of the second liquid fuel can be easily detected from the outside through the detection window. Therefore, the remaining amount of liquid fuels can be reliably detected. As a result, liquid fuel with a predetermined concentration can be more stably supplied to the fuel cell body.

In the fuel cartridge for the fuel cell according to the present invention, the detection window is constructed to allow light irradiated from the fuel cell body to pass through the detection window. With this arrangement, light reaches the detection window from the outside, and thus the liquid surface of the first liquid fuel or the liquid surface of the second liquid fuel is detected. Therefore, the remaining amount can be easily known.

In the fuel cartridge for the fuel cell according to the present invention, a liquid surface indication member may be arranged in the first chamber or the second chamber, for indicating the position of the liquid surface of the first liquid fuel or the position of the liquid surface of the second liquid fuel. With this arrangement, the level of the liquid surface indication member is detected, and thus level of the liquid surface of the first liquid fuel or the liquid surface of the second liquid fuel. Therefore, the remaining amount can be reliably known.

In the fuel cartridge for the fuel cell according to the present invention, the liquid surface indication member may include a float that floats on the liquid surface. With this arrangement, the liquid surface indication member can indicate the liquid surface more accurately.

The present invention provides a fuel cell characterized by a fuel cell body having a fuel pole and the fuel cartridge for the fuel cell according to any one of above-mentioned structures to accommodate liquid fuel to be supplied to the fuel pole. In the fuel cell, by exchanging the cartridge, the liquid fuel can be reliably supplied to the fuel cell body. Therefore, fuel at a predetermined concentration can be stably supplied to the fuel pole.

In the fuel cell according to the present invention, a fuel mixing tank for mixing the first liquid fuel and the second liquid fuel may be arranged in the fuel cell body. With this arrangement, the structure of the fuel cartridge for the fuel cell can be simplified. Therefore, the cost of manufacturing the fuel cartridge for the fuel cell can be reduced.

In the fuel cell according to the present invention, a measurement section for measuring the level of the liquid surface of the first liquid fuel or the second liquid fuel may be arranged in the fuel cell body. With this arrangement, the remaining amount of the first liquid fuel or the second liquid fuel can be reliably known. Also, the structure of the fuel cartridge for the fuel cell can be simplified.

As a measurement section in the fuel cell, various arrangements can be used. For example, the measurement section may include a light source for irradiating light to the inside of the fuel cartridge used in the fuel cell through the detection window and a light receiving section for receiving the light irradiated from the light source. Also, a magnet may be arranged in the float, so that the magnetic field generated by the magnet can be detected while the float floats in the first liquid fuel or in the second liquid fuel in the fuel cartridge used for the fuel cell. Further, the measurement section may include a sounding section to generate a sound wave used for detection and a sound collection section to collect the sound wave used for detection, the fuel cartridge used for the fuel cell may include an introducing section to introduce the sound wave for detection to the inside and a emitting section to originate the sound wave used for detection to the outside, and the level of the liquid surface of the first liquid fuel or the position of the liquid surface of the second liquid fuel may be detected by the conditions of the sound wave used for detection generated in the sound generating section and the sound wave originated from the emitting section.

Additionally, any combination of the above elements is available as an aspect of the present invention.

DETAILED DESCRIPTION OF THE PREFERRED EMBODIMENTS

Figure 1:
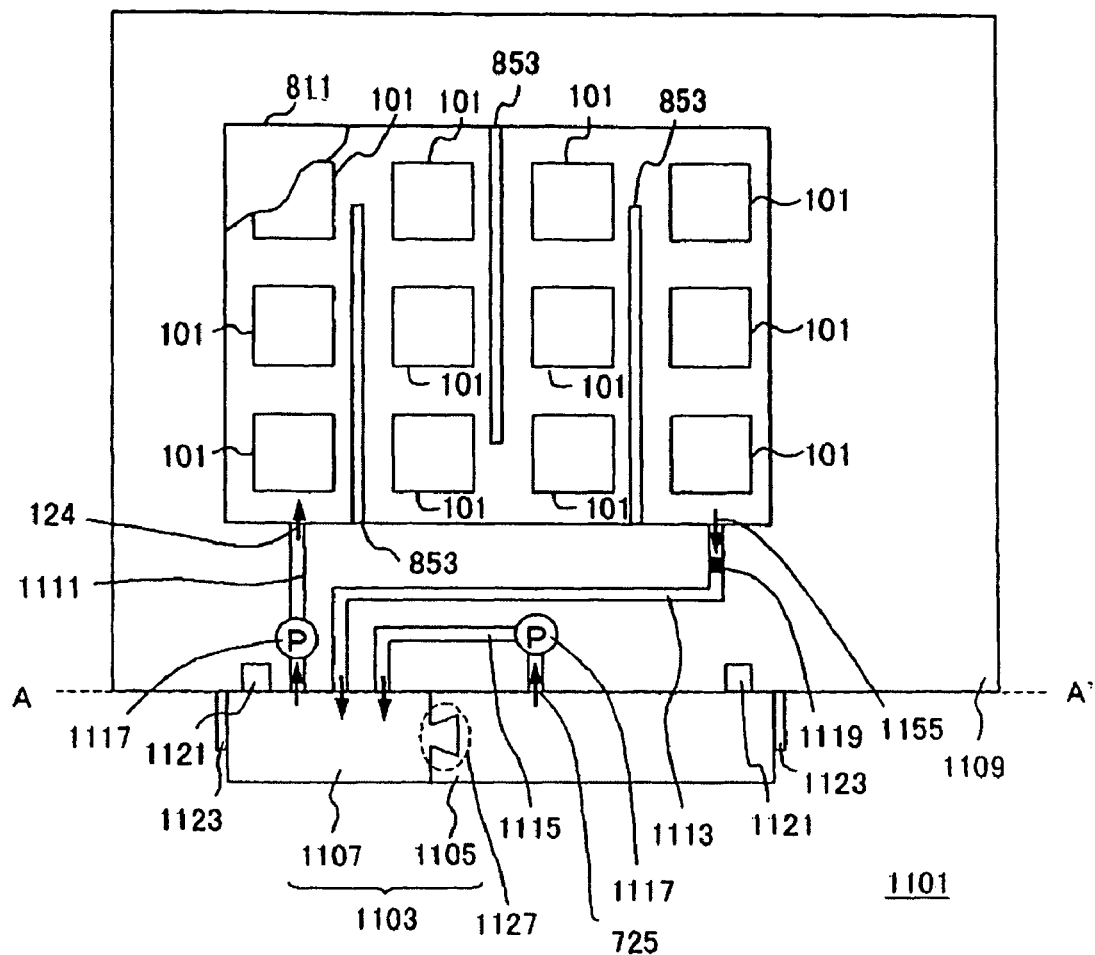
[FIG. 1] It is a view schematically showing a structure of a fuel cell according to a first embodiment of the present invention.

Hereinafter, explanations are given of a fuel cell system (hereinafter, called "fuel cell") retaining a plurality of liquid fuels with various concentrations and having a fuel cartridge for a fuel cell (hereinafter, called "fuel cartridge") removably mounted to a fuel cell body. In the fuel cell of the present invention, the fuel cartridge accommodates a plurality of liquid fuels having various concentrations and is provided with a plurality of fuel tanks that are attachable and detachable to one another.

Further, the fuel cell is provided with a fuel-mixing tank that is used to mix the plurality of liquid fuels at various concentrations to prepare fuel at a predetermined concentration, and then supplies the fuel to a fuel pole. The mixing tank may be one of the plurality of tanks in the fuel cartridge or may be arranged in the fuel cell body. In order to adjust the fuel concentration, a liquid transfer member, such as a pump, for supplying liquid fuel at each concentration to the mixing tank and a control section for controlling the presence or absence of liquid to be transferred or the amount of liquid to be transferred are arranged.

In the fuel cell of the present invention, liquid fuel at a desired concentration can be stably supplied to the fuel pole. Therefore, crossover can be prevented, and high output can be stably exerted.

Further, a remaining amount detector for detecting the remaining amount of the plurality of liquid fuels held in the fuel cartridge is arranged. Therefore, when each tank becomes empty, it can be exchanged immediately. In this case, since the tanks can be separated, each tank can be exchanged at different times. Therefore, efficiency in use of fuel can be improved.

Hereinafter, explanations are given of embodiments according to the present invention with reference to drawings. In all drawings, the same reference numeral is applied to the same element, and explanations thereof are omitted, as appropriate. Incidentally, there is no limitation on the use of the fuel cell, which will be explained in the following embodiments, and the fuel cell can be suitably used in small electronic devices, such as a mobile telephone, a notebook type portable personal computer, PDA (Personal Digital Assistant), various cameras, a navigation system, a portable music player.

First Embodiment

FIG. 1 is a plan view schematically showing a structure of a fuel cell according to the first embodiment. Fuel cell 1101 in FIG. 1 includes fuel cell body 1109 and fuel cartridge 1103. Fuel cell body 1109 includes a plurality of single cell structures 101, fuel container 811, partition plate 853, fuel supply pipe 1111, fuel recovery pipe 1113, high-concentration fuel supply pipe 1115, pump 1117, concentration meter 1119, liquid surface meter 1121, and connector 1123.

Fuel cartridge 1103 is constructed so as to be removably mountable to fuel cell body 1109. Fuel cartridge 1103 is constructed such that high-concentration fuel tank 1105 and mixing tank 1107 are detachably connected at fitting section 1127. High-concentration fuel tank 1105 and mixing tank 1107 are attached to and detached from fuel cell body 1109 while being linked. In the initial state, mixing tank 1107 is filled with low-concentration fuel and high-concentration fuel tank 1105 is filled with high-concentration fuel 725 at a higher concentration of fuel component than the liquid in mixing tank 1107.

The level of the concentration of low-concentration fuel and the level of the concentration of high-concentration fuel 725 are appropriately selected. For example, when the organic fuel component is methanol, methanol aqueous solution at a concatenation of about 50% by volume or less or water can be stored in the low-concentration fuel. The concentration of fuel 124 is suitable for supplying fuel 124 to fuel cell body 1109. In this case, a methanol aqueous solution at a higher-concentration than fuel 124 or methanol can be stored in high-concentration fuel tank 110.

High-concentration fuel tank 1105 and mixing tank 1107 are preferably made of a material that is resistant to the fuel component. As such a material, resin materials, such as polypropylene, polyethylene, vinyl chloride, silicon, are exemplified.

Fuel 124 that is adjusted to a predetermined concentration of fuel component in mixing tank 1107 is supplied to fuel container 811 through fuel supply pipe 1111. Fuel 124 flows along the plurality of partition plates 853 arranged in fuel container 811 and is sequentially supplied to the plurality of single cell structures 101. The fuel that has circulated through the plurality of single cell structures 101 is recovered in mixing tank 1107 through fuel recovery pipe 1113. The concentration of recovered fuel 1155 from fuel recovery pipe 1113 is measured by concentration meter 1119.

Incidentally, detailed explanations will be given of single cell structure 101 later. In the first embodiment and following embodiments, fuel 124 is liquid fuel to be supplied to single cell structure 101 and includes an organic solvent, i.e., a fuel component and water. As fuel components included in fuel 124, methanol, ethanol, dimethyl ether, or other alcohols, or organic liquid fuel of liquid hydrocarbons, such as cycloparaffin, may be used. Hereinafter, explanations are given of a case in which the fuel component is methanol, as an example. Also, as an oxidizer, air may be usually used or oxygen gas may be supplied.

High-concentration fuel 725 in high-concentration fuel tank 1105 flows into mixing tank 1107 through high-concentration fuel supply pipe 1115 in fuel cell body 1109. Pumps 1117 are arranged for fuel supply pipe 1111 and high-concentration fuel supply pipe 1115, and the outflow of fuel 124 from mixing tank 1107 to fuel container 811 and the inflow of high-concentration fuel 725 from high-concentration fuel tank 1105 to mixing tank 1107 are adjusted.

In mixing tank 1107, the low-concentration fuel that is initially filled, recovered fuel 1155 that is recovered from fuel recovery pipe 1113, and high-concentration fuel 725 that is refilled from high-concentration fuel tank 1105 are mixed. The concentration of liquid fuel component in mixing tank 1107 is adjusted to a suitable concentration to be supplied to single cell structures 101, and the amount of fuel that passes through high-concentration fuel supply pipe 1115 is adjusted in accordance with a concentration of the fuel in mixing tank 1107.

Pump 1117 may includes, for example, a compact piezoelectric motor with very low power consumption. Also, fuel cell 1101 may be provided with a control section for controlling the operation of pump 1117, as described later, not shown in FIG. 1.

Figure 2:
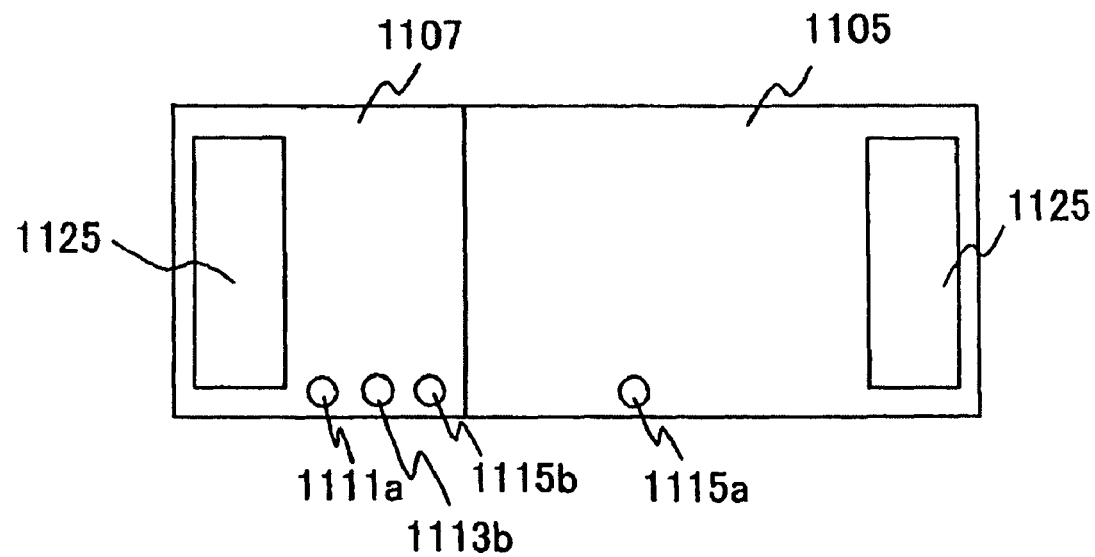
[FIG. 2] It is a cross-sectional view taken along line A-A' shown in FIG. 1.

FIG. 2 is a cross-sectional view taken along line A-A' of fuel cartridge 1103 in FIG. 1. As shown in FIG. 2, high-concentration fuel tank 1105 is provided with fuel inflow pipe connection hole 1115a at a position that is connected to high-concentration fuel supply pipe 1115 when fuel cartridge 1103 is attached to connector 1123 of fuel cell body 1109. Also, mixing tank 1107 is provided with fuel outflow pipe connection hole 1111 a, fuel recovery pipe connection hole 1113b, and fuel inflow pipe connection hole 1115b at positions that are respectively connected to fuel supply pipe 1111, fuel recovery pipe 1113, and high-concentration fuel supply pipe 1115 when fuel cartridge 1103 is attached to fuel cell body 1109. Further, high-concentration fuel tank 1105 and mixing tank 1107 are provided with liquid surface indication windows 1125 on the surface which faces to fuel cell body 1109.

Figure 22:
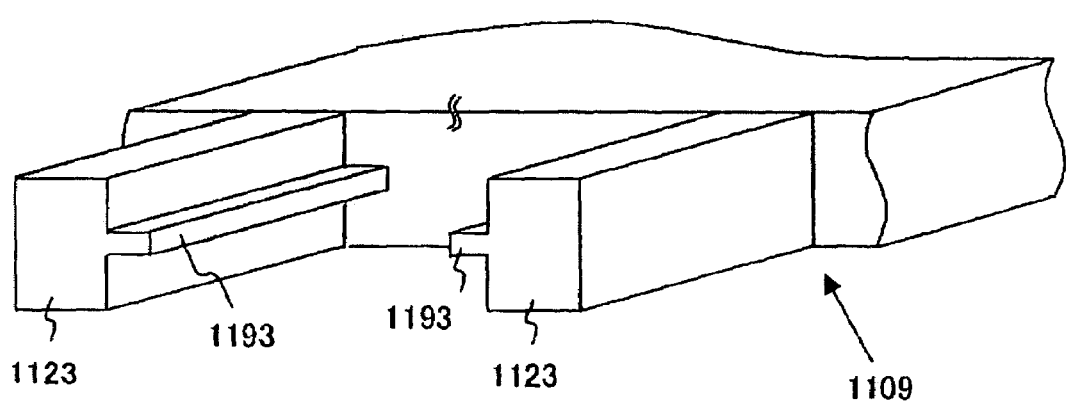
[FIG. 22] It is a perspective view showing a structure of a connector of the fuel cell body in the fuel cell according to the present invention.
Figure 23:
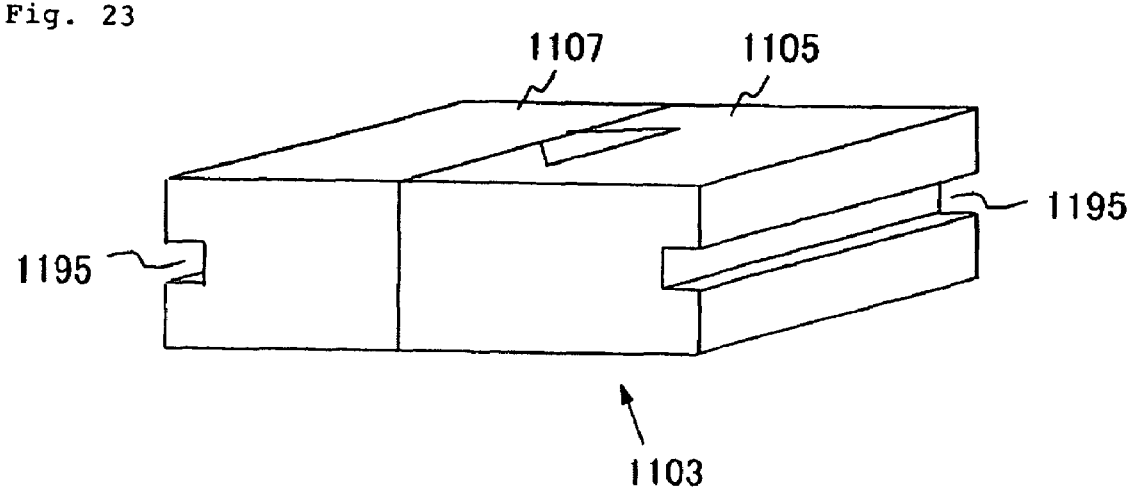
[FIG. 23] It is a perspective view showing a structure of a fuel cartridge for the fuel cell according to this embodiment.

FIG. 22 is a perspective view showing an area around connectors 1123 in fuel cell body 1109. Also, FIG. 23 is a perspective view showing the structure of fuel cartridge 1103. Fuel cartridge 1103 in FIG. 23 is shown in the state where high-concentration fuel tank 1105 and mixing tank 1107 are linked. As shown in FIGS. 22 and 23, connecter 1123 has support section 1193 formed in a convex shape on the surface which contacts with fuel cartridge 1103. Also, groove section 1195 in a shape corresponding to support section 1193 is arranged on the side surface of fuel cartridge 1103. The groove section of fuel cartridge 1103 is fitted to support section 1193 of connector 1123 and is slid relative to the connector, thereby attaching fuel cartridge 1103 to fuel cell body 1109.

Figure 3A:
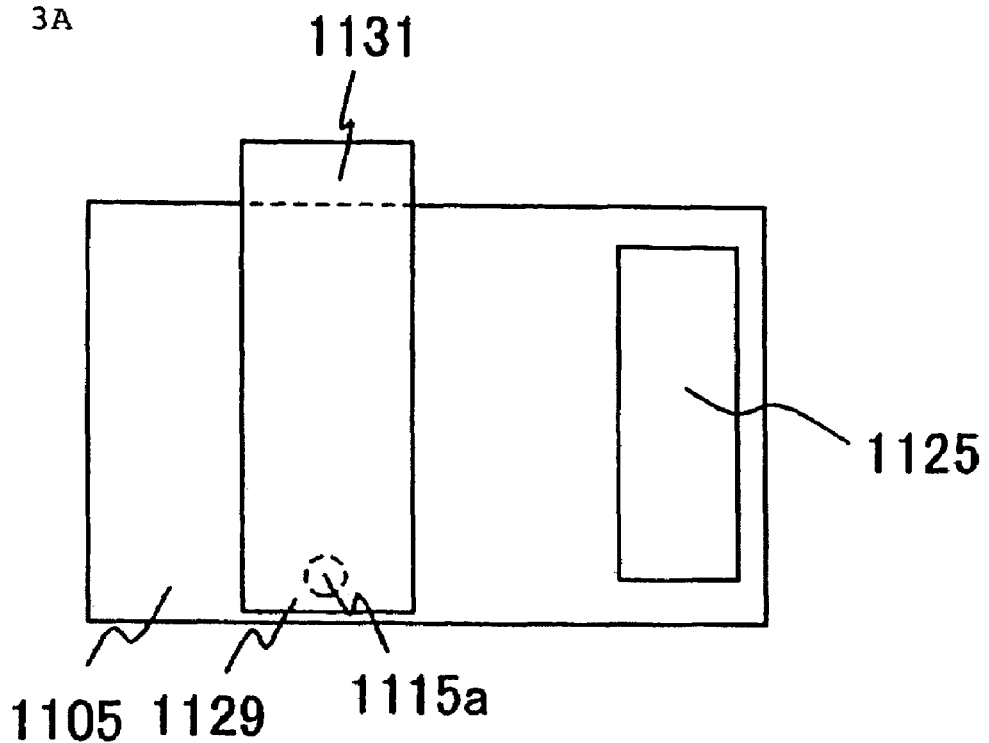
[FIG. 3A] It is a cross-sectional view showing a structure of a high-concentration fuel tank in the fuel cell shown in FIG. 1.
Figure 3B:
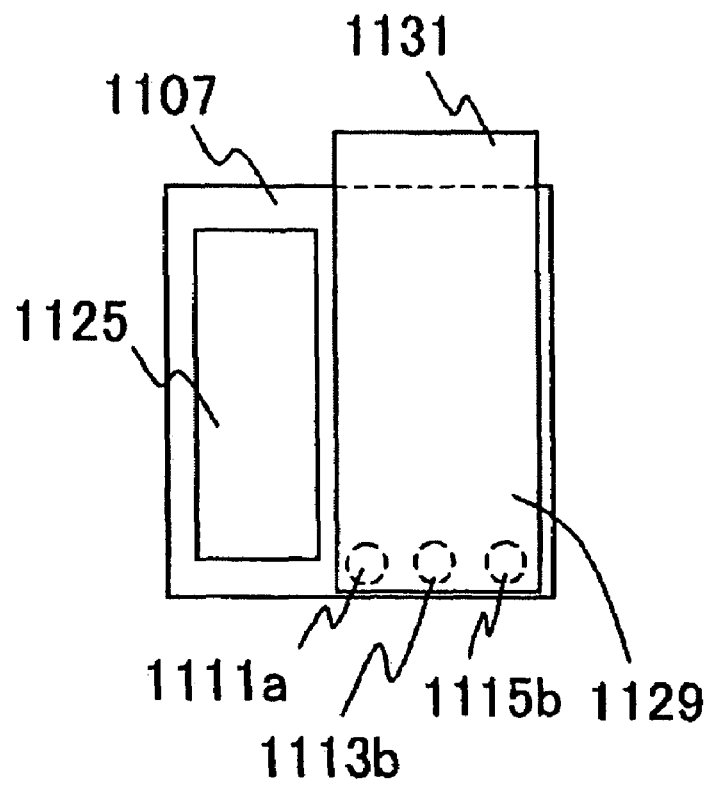
[FIG. 3B] It is a cross-sectional view showing a structure of a mixing tank in the fuel cell shown in FIG. 1.
Figure 4A:
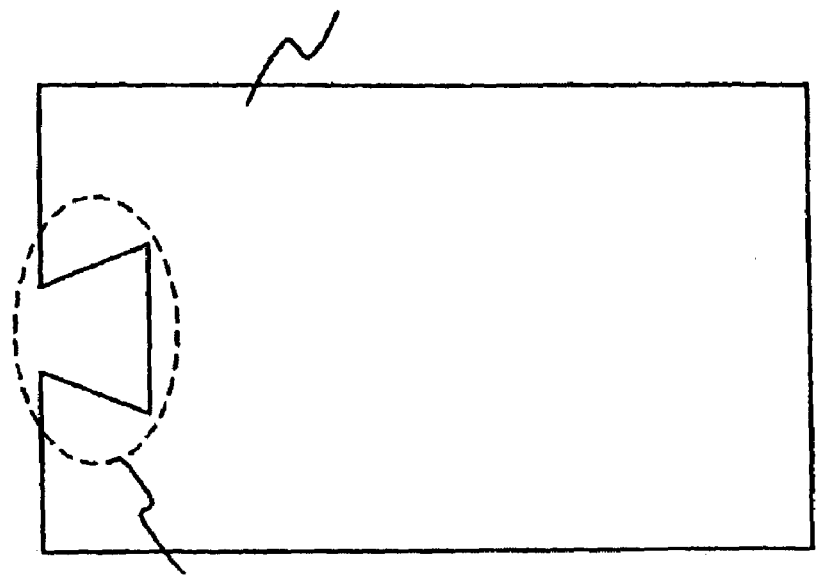
[FIG. 4A] It is a view showing the structure of the high-concentration fuel tank in the fuel cell shown in FIG. 1.
Figure 4B:
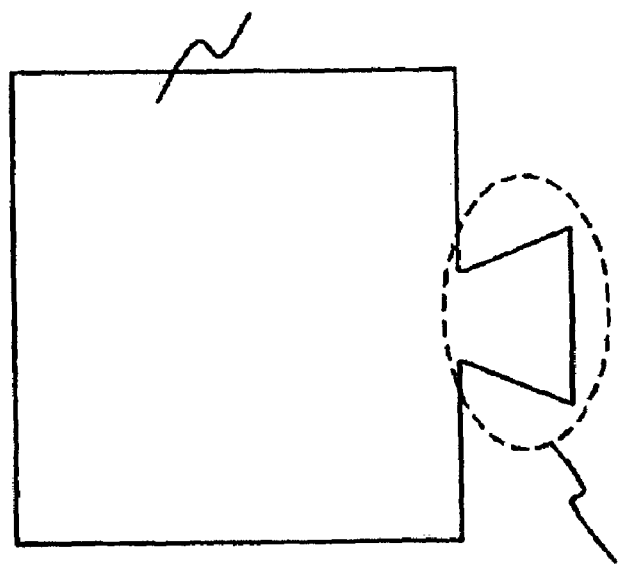
[FIG. 4B] It is a view showing the structure of the mixing tank in the fuel cell shown in FIG. 1.

FIGS. 3A and 4A are views showing high-concentration fuel tank 1105 prior to use. FIGS. 3B and 4B are views showing mixing tank 1107 prior to use. FIGS. 3A and 3B are viewed from the same direction as FIG. 2. FIGS. 4A and 4B are viewed from the same direction as FIG. 1.

As shown in FIGS. 3A and 3B, fuel inflow pipe connection hole 1115a is initially covered by seal 1129. Fuel outflow pipe connection hole 1111a, fuel recovery pipe connection hole 1113b, and fuel inflow pipe connection hole 1115b are covered by seal 1129. Therefore, the contents of high-concentration fuel tank 1105 and mixing tank 1107 are prevented from leaking. When these tanks are used, seals 1129 are peeled off from peeling section 1131 and are removed from each tank, and these tanks are used in a state where each connection hole is opened.

Seal 1129 may be formed so as to be peeled off when high-concentration fuel tank 1105 or mixing tank 1107 is used. For example, emulsion adhesives, such as vinyl acetate, may be coated on a surface of a thin film made of various plastic materials. Also, epoxy or silicon adhesives may be used.

Figure 5:
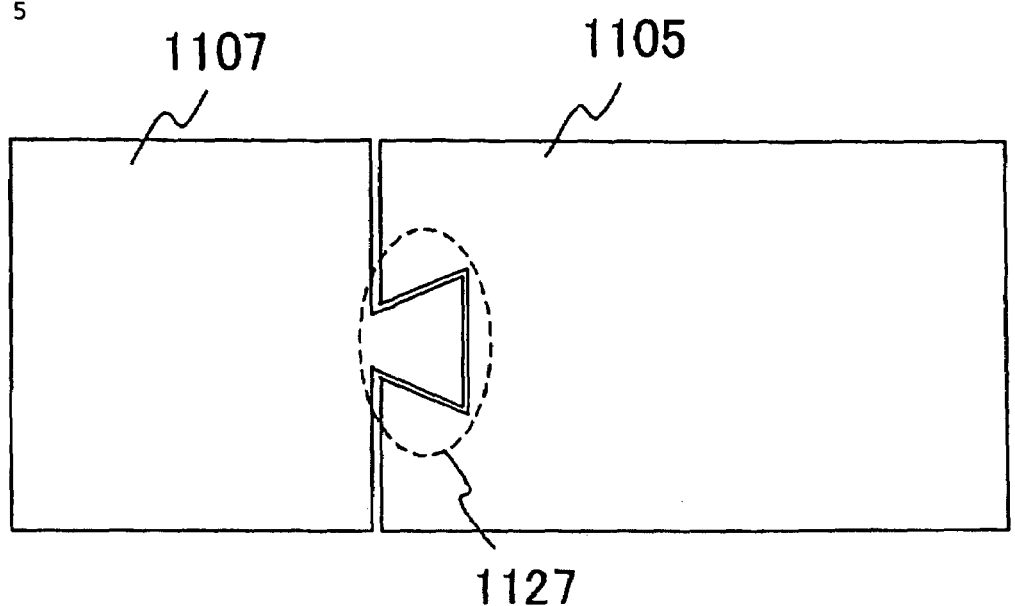
[FIG. 5] It is a view showing a structure of a fuel cartridge for the fuel cell shown in FIG. 1.

Further, as shown in FIGS. 4A and 4B, high-concentration fuel tank 1105 is provided with concave section 1133, and mixing tank 1107 is provided with convex section 1135 which can fit into concave section 1133. FIG. 5 shows a state in that concave section 1133 and convex section 1135 are fitted. FIG. 5 is viewed from the same direction as FIG. 1. In the state shown in FIG. 5, fuel cartridge 1103 can be attached to fuel cell body 1109.

Also, as shown in FIGS. 3A and 3B, high-concentration fuel tank 1105 and mixing tank 1107 are provided with liquid surface indication windows 1125 on the surface facing to fuel cell body 1109. Liquid surface indication window 1125 is a transparent member and is constructed such that the remaining amount of high-concentration fuel 725 in high-concentration fuel tank 1105 or the liquid in mixing tank 1107 can be measured from the outside.

Figure 6:
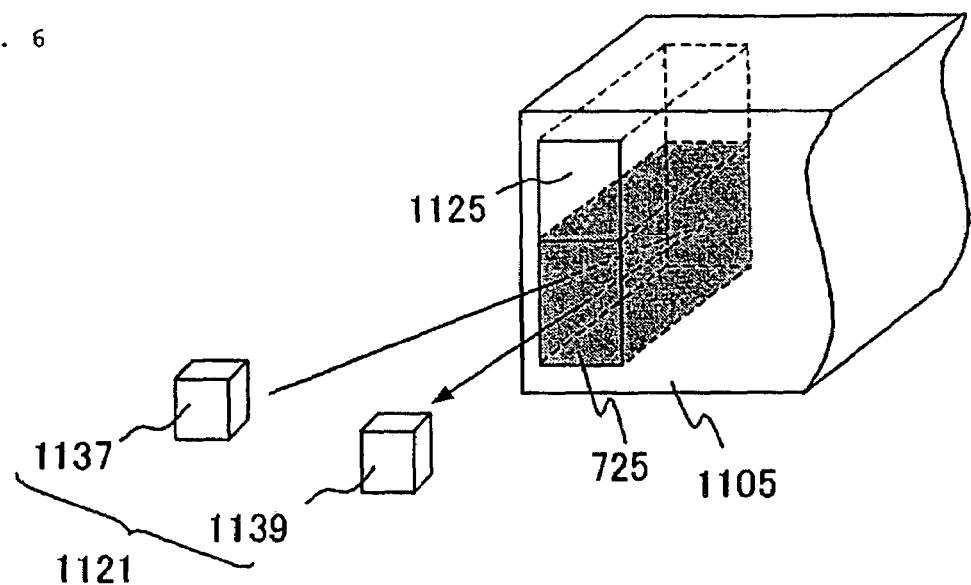
[FIG. 6] It is a view for explaining a method of measuring the level of a liquid surface from a liquid surface indication window for indicating high-concentration fuel in the fuel cell shown in FIG. 1.

FIG. 6 is a view for explaining the method of measuring the level of the liquid surface from liquid surface indication window 1125 of high-concentration fuel tank 1105. In this description, explanations are given of high-concentration fuel tank 1105, as an example, however, the same arrangement can be used for mixing tank 1107.

Liquid surface meter 1121 of fuel cell body 1109 includes light source 1137 and light receiving section 1139. Light source 1137 applies light to liquid surface indication window 1125. In FIG. 6, the light is irradiated to the area of remaining high-concentration fuel 725. Irradiated light is allowed to pass through liquid surface indication window 1125. For example, visible light may be used. Also, the irradiated light may be laser light. Further, light receiving section 1139 detects light reflected by high-concentration fuel tank 1105, from light that comes from light source 1137. The liquid surface of high-concentration fuel 725 can be detected on the basis of change of the strength or the output angle of the reflected light between the case where the light is irradiated to the area of remaining high-concentration fuel 725 and the case where the light is irradiated to a vacant space. For example, the liquid surface may be measured by moving light source 1137 or light receiving section 1139 in up and down direction in FIG. 6.

Figure 7:
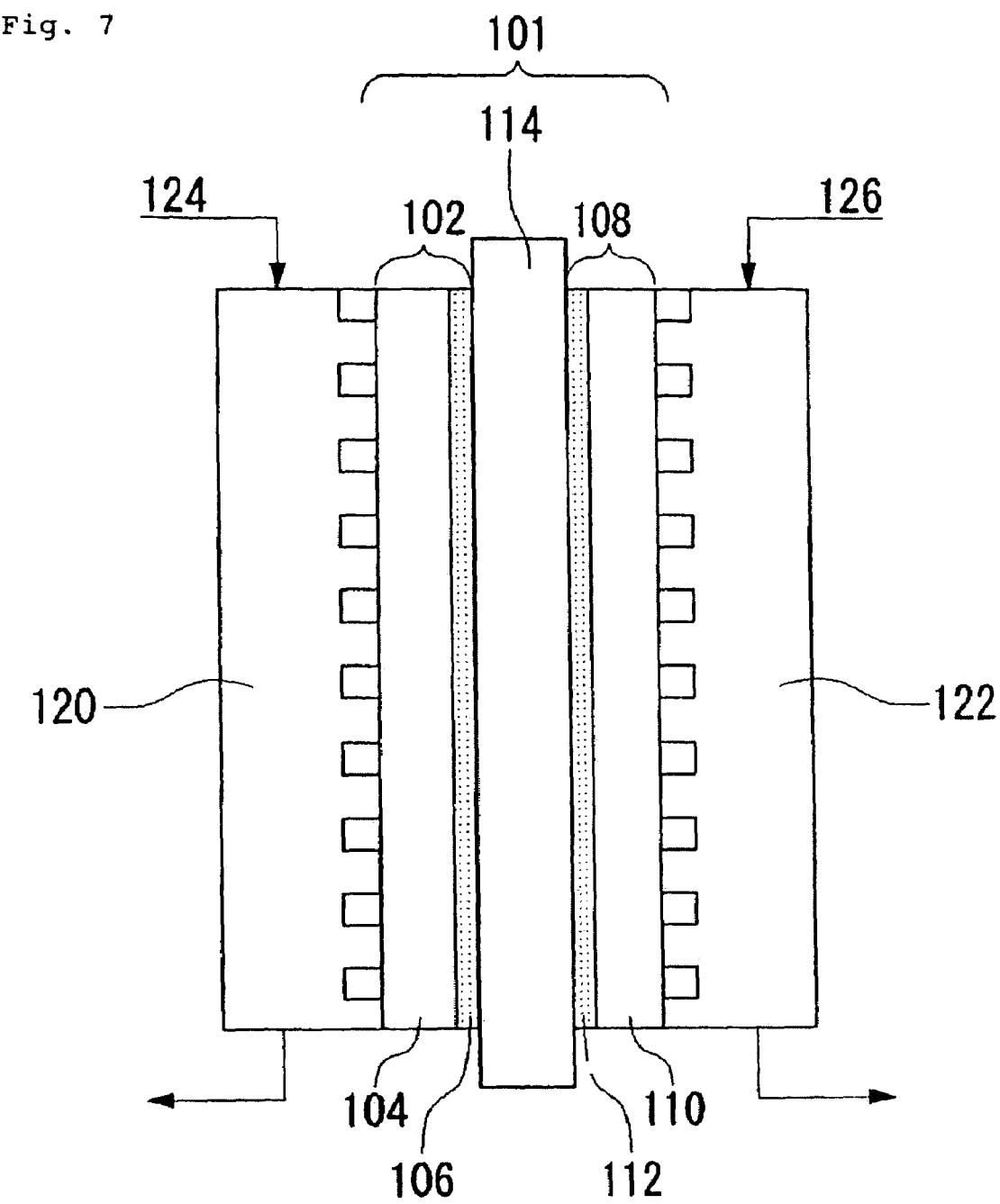
[FIG. 7] It is a view schematically showing a single-cell structure of the fuel cell according to the present invention.

Next, the structure of single cell structure 101 shown in FIG. 1 is explained with reference to FIG. 7. FIG. 7 is a cross-sectional view schematically showing single cell structure 101. Each single cell structure 101 includes fuel pole 102, oxidizer pole 108, and solid electrolyte film 114. As described above, fuel 124 is supplied to fuel pole 102 in single cell structure 101 through fuel pole side separator 120. Also, oxidizer 126 is supplied to oxidizer pole 108 in each single cell structure 101 through oxidizer pole side separator 122.

Solid electrolyte film 114 separates fuel pole 102 and oxidizer pole 108 and moves hydrogen ions between both poles. Therefore, solid electrolyte film 114 is preferably a film having high hydrogen ionic conductivity. Also, preferably, solid electrolyte film 114 is chemically stable and provides high mechanical strength.

As materials for solid electrolyte film 114, preferably, an organic high polymer having a polarity radical, a strong acid radical, such as a sulfone radical, a phosphoric acid radical, a phosphonic radical, a phosphine radical, or a weak acid radical, such as a carboxyl radical, may be used. As such an organic high polymer, an aromatic-containing high polymer, such as sulfonic poly(4-phenoxy benzoyl-1,4-phenylene) and alkyl sulfonic poly benzimidazole may be used; a copolymer, such as a polystyrene sulfonic acid copolymer, a polyvinyl sulfonic acid copolymer, a bridge alkyl sulfonic acid derivative, a fluorine containing high polymer including fluorine resin skeleton and a sulfonic acid may be used; a copolymer obtained by copolymerizing acrylamides, such as acrylamide-2-methylpropane sulfonic acid, and acrylates, such as n-butyl methacrylate may be used; sulfone-radical-containing perfluorocompounds [Nafion (manufactured by Dupont CO., LTD: registered trade mark) Aciplex (manufactured by Asahi KASEI CO., LTD: registered trade mark)], or carboxyl-base-containing perfluorocompounds [Flemion S fim (manufactured by Asahi GLASS CO., LTD)] are mentioned as examples. When an aromatic-containing high polymer, such as sulfonic poly(4-phenoxy benzoyl-1,4-phenylene) and alkyl sulfonic poly benzimidazole, is selected from among them, it is possible to prevent the organic liquid fuel from passing through solid electrolyte film 114 and to suppress reduction in battery efficiency caused by crossover.

Fuel pole 102 and oxidizer pole 108 are respectively constructed by forming fuel pole side catalyst layer 106 and oxidizer pole side catalyst layer 112 that have carbon particles supporting a catalyst and fine particles of solid electrolyte, on substrate 104 and substrate 110. As catalysts, platinum and an alloy of platinum and ruthenium are taken as examples. For fuel pole 102 and oxidizer pole 108, the same catalyst may be used or different catalysts may be used.

A water-repellent process may be applied to surfaces of substrate 104 and substrate 110. As described above, when methanol is used as fuel 124, carbon dioxide is generated at fuel pole 102. When bubbles of carbon dioxide generated at fuel pole 102 are retained near fuel pole 102, fuel 124 is inhibited from being supplied to fuel pole 102 to cause to reduce efficiency in electric power generation. Therefore, preferably, the surface of substrate 104 is treated by hydrophilic coating materials or hydrophobic coating materials. When the surface is treated with the hydrophilic coating materials, the flowability of the fuel on the surface of substrate 104 is improved. With this arrangement, bubbles of carbon dioxide move easily together with fuel 124. When the surface is treated with the hydrophobic coating materials, moisture which becomes a cause of bubbles is prevented from adhering to the surface of substrate 104. Therefore, the formation of bubbles on the surface of substrate 104 can be reduced. As hydrophilic coating materials, titanium oxides, silicon oxides, and the like are mentioned as examples. On the other hand, as hydrophobic coating materials, poly(tetrafluoroethylene), silane, and the like are taken as examples.

Single cell structures 101 constructed, as described above, are arranged as shown in FIG. 1, thereby obtaining fuel cell body 1109 in which a plurality of single cell structures 101 are connected in series. Further, single cell structures 101 are stacked, thereby obtaining a fuel cell including a fuel cell stack.

Since fuel cell 1101 adopts the above-mentioned arrangement, recovered fuel 1155 recovered from fuel recovery pipe 1113 is adjusted to a suitable concentration in mixing tank 1 107 and is supplied to fuel container 811 again. Therefore, with a simple device arrangement, fuel 124 is supplied with a stable concentration.

Further, when the amount remaining in high-concentration fuel tank 1105 or mixing tank 1107 in fuel cartridge 1103 is reduced, each tank can be changed at different times. Therefore, the contents of each tank can be completely used. Accordingly, efficiency in use of fuel can be improved.

Next, explanations are given of the structure of concentration meter 1119 and the method of controlling the concentration of fuel 124 mixed in mixing tank 1107 and supplied to fuel container 811. In this description, explanations are given of a case where a concentration sensor is arranged in mixing tank 1107 and the operation of each pump 1117 is feedback-controlled in accordance with methanol concentration in the liquid in mixing tank 1107.

Figure 20:
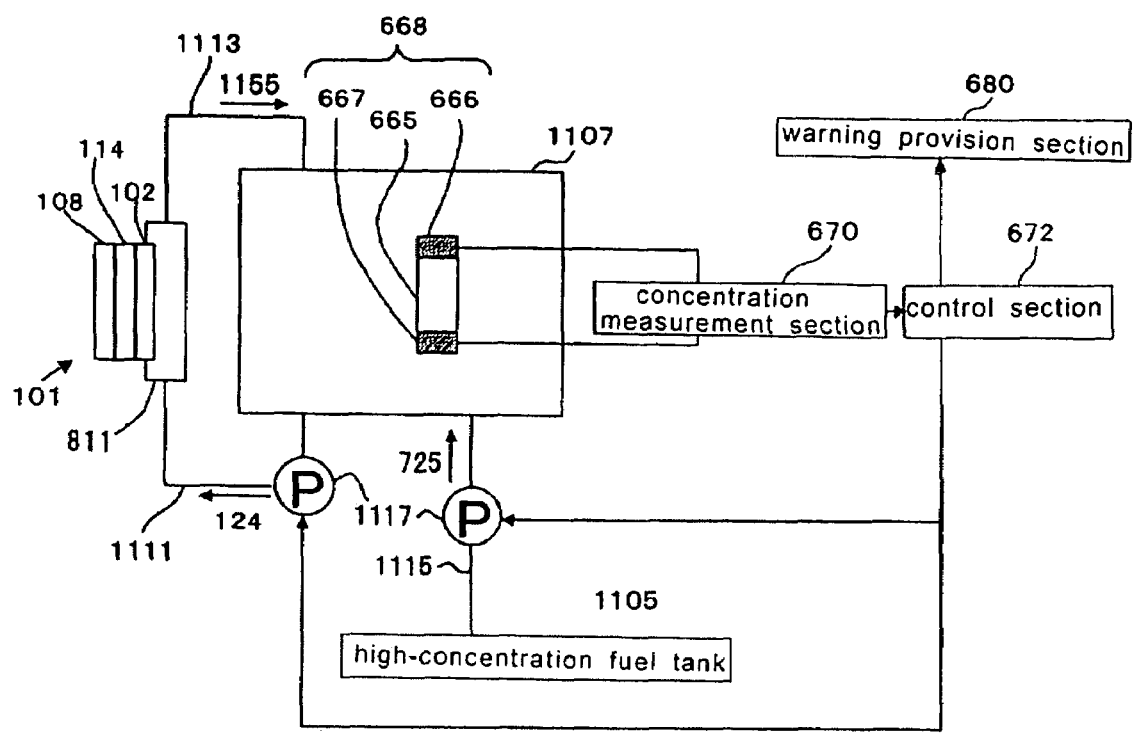
[FIG. 20] It is a view showing a fuel concentration control system and a peripheral structure thereof arranged in the fuel cell according to the present invention.

FIG. 20 is a view showing a fuel concentration control system and the peripheral mechanism thereof arranged in fuel cell body 1109. In FIG. 20, the control system includes sensor 668, concentration measurement section 670, control section 672, pump 1117, and warning provision section 680. Sensor 668 and concentration measurement section 670 make up concentration meter 1119.

Sensor 668 is used to detect the concentration of the organic fuel component (methanol) of fuel 124 in mixing tank 1107. Sensor 668 includes high polymer film 665, first electrode terminal 666, and second electrode terminal 667. High polymer film 665 is a high polymer film with proton conductivity. High polymer film 665 is configured to impregnate fuel 124 in mixing tank 1107, and is made of a material whose proton conductivity is changed in accordance with the concentration of alcohol in fuel 124. High polymer film 665 is made of, for example, the same material as solid electrolytic film 114 in single cell structure 101. Proton conductivity is changed in accordance with the concentration of alcohol in fuel 124 in mixing tank 1107, and therefore, when a current flows between first electrode terminal 666 and second electrode terminal 667 through high polymer film 665, the resistance value between first electrode terminal 666 and second electrode terminal 667 changes. Concentration measurement section 670 compares the resistance value between first electrode terminal 666 and second electrode terminal 667 with the calibration curve data stored in measurement section 670 to measure the concentration of alcohol in fuel 124 in mixing tank 1107.

Figure 21A:
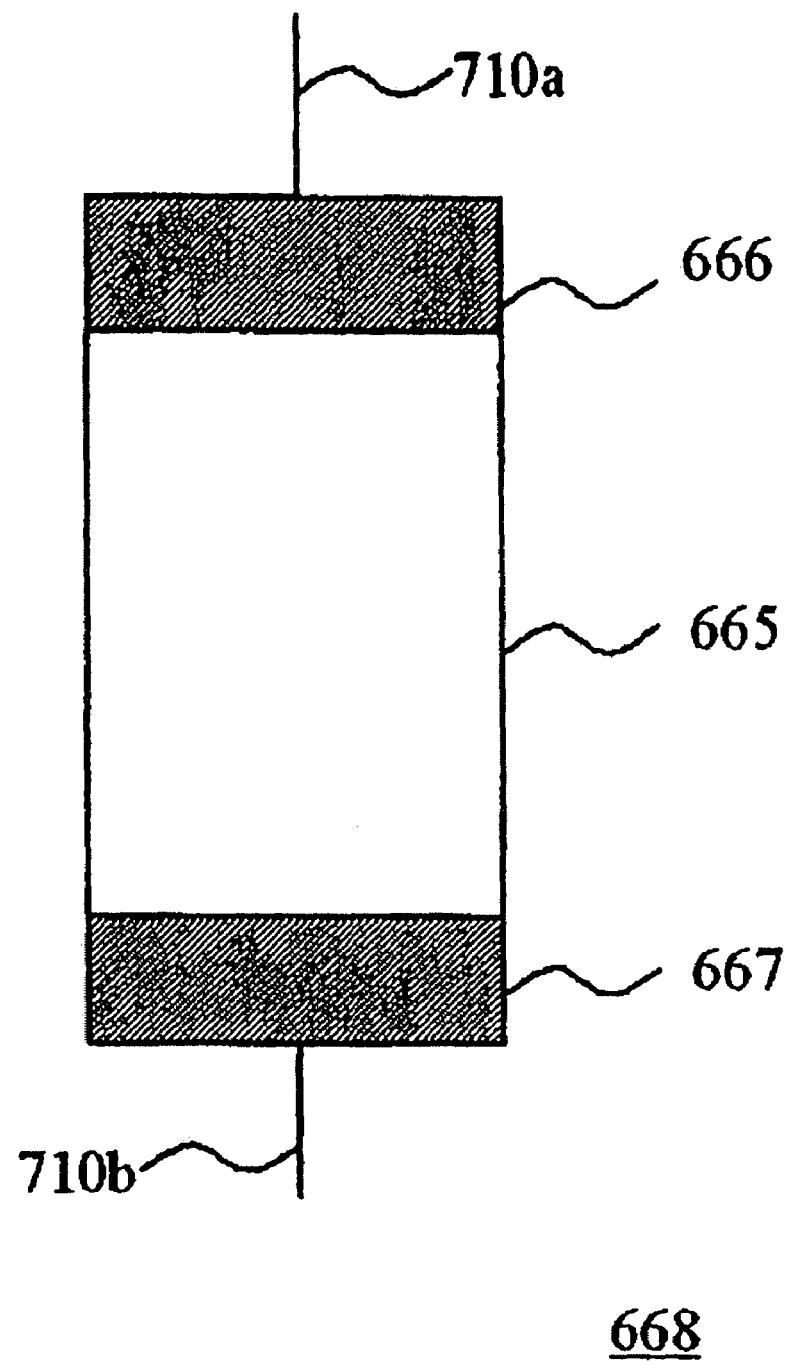
[FIG. 21A] It is a view showing a sensor shown in FIG. 20 in detail.
Figure 21B:
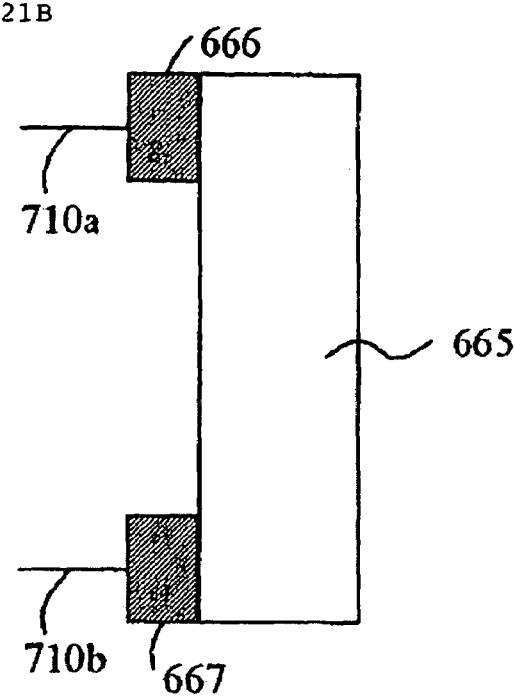
[FIG. 21B] It is a view showing the sensor shown in FIG. 20 in detail.

FIGS. 21A and 21B are views showing sensor 668 in detail. FIG. 21A is a view showing the surface on which first electrode terminal 666 and second electrode terminal 667 of sensor 668 are arranged, and FIG. 21B is a side view of FIG. 21A. First electrode terminal 666 and second electrode terminal 667 are made of conductive materials that stably exist in fuel 124. First electrode terminal 666 and second electrode terminal 667 may be pasted on high polymer film 665 by conductive paste. As the conductive paste, polymer paste including metal, like gold or silver, or polymer paste, like acrylic amide, having conductivity in itself may be used. First electrode terminal 666 and second electrode terminal 667 are electrically connected to concentration measurement section 670 shown in FIGS. 21A and 21B through wirings 710a and 710b, respectively.

In FIG. 20, the concentration of alcohol in fuel 124 in mixing tank 1107, which is measured by concentration measurement section 670, is transmitted to control section 672. Control section 672 determines whether the concentration of alcohol measured by concentration measurement section 670 is within a proper range or not, and controls pump 1117 arranged in high-concentration fuel supply pipe 1115 such that the alcohol concentration of fuel 124 in mixing tank 1107 is within the proper range. Pump 1117 is controlled by control section 672, and then the amount of high-concentration fuel 725 that will be supplied from high-concentration fuel tank 1105 to mixing tank 1107 is controlled.

Also, control section 672 makes warning provision section 680 give warning, when the alcohol concentration of fuel 124 in mixing tank 1107 is not within the proper range although the process of controlling pump 117 has been repeated. Further, control section 672 may control the supply of fuel 124 from mixing tank 1107 to fuel container 811. In this case, control section 672 controls the operation of pump 1117 in fuel supply pipe 1111. This control may be performed by further detecting the output from fuel cell body 1109 in order to give feedback in accordance with the detected value.

According to this arrangement, with the simple structure in which only first electrode terminal 666 and second electrode terminal 667 are attached to high polymer film 665, the concentration of alcohol in mixing tank 1107 can be detected and the concentration of fuel 124 to be supplied to fuel container 811 can be controlled.

Second Embodiment

Fuel cell 1101 according to the first embodiment provides the arrangement in which one of the two tanks included in fuel cartridge 1103 is mixing tank 1107, however, mixing tank 1107 may be arranged in fuel cell body 1109.

Figure 8:
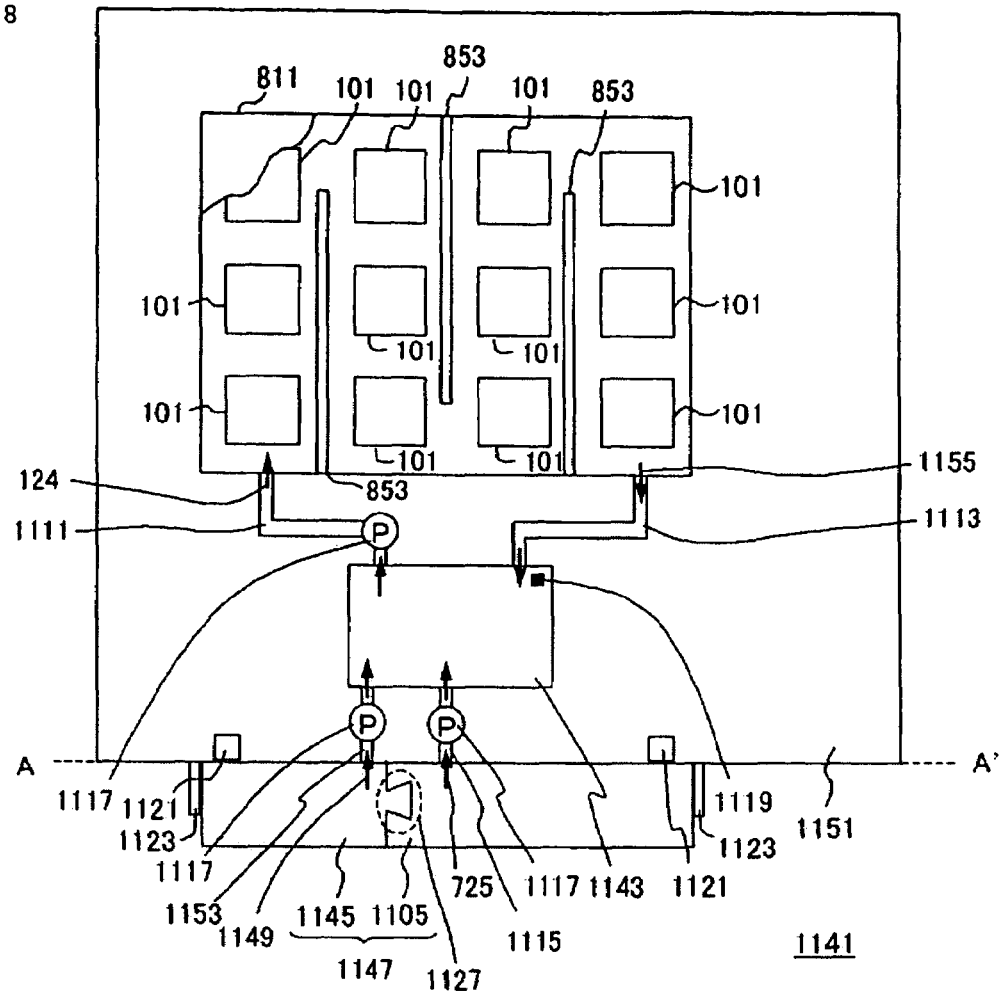
[FIG. 8] It is a view schematically showing a structure of a fuel cell according to a second embodiment of the present invention.

FIG. 8 is a view schematically showing fuel cell 1141 according to the second embodiment. The principal configuration of fuel cell 1141 shown in FIG. 8 is approximately similar to that of fuel cell 1101 shown in FIG. 1, however, there are differences in that mixing tank 1143 is provided in fuel cell body 1151 and fuel cartridge 1147 is provided with low-concentration tank 1145 instead of mixing tank 1107. Hereinafter, detailed explanations are given of differences from the first embodiment.

Mixing tank 1143 is connected to fuel container 811 through fuel supply pipe 1111 and fuel recovery pipe 1113, similarly to mixing tank 1107. Also, in mixing tank 1143, high-concentration fuel 725 and low-concentration fuel 1149 are added to recovered fuel 1155 recovered from fuel recovery pipe 113 such that fuel 124 to be supplied to fuel container 811 reaches a desirable concentration. In this process, the respective fuels are mixed, and thus fuel 124 at a predetermined concentration is supplied from fuel supply pipe 1111 to fuel container 811.

In fuel cartridge 1147, low-concentration fuel tank 1145 and high-concentration fuel tank 1105 are separated and attachable and detachable, similar to fuel cartridge 1103. These tanks are attached to connecter 1123 of fuel cell body 1151 while being fitted at fitting section 1127, and high-concentration fuel 725 and low-concentration fuel 1149 can be supplied to fuel cell body 1151.

Figure 9:
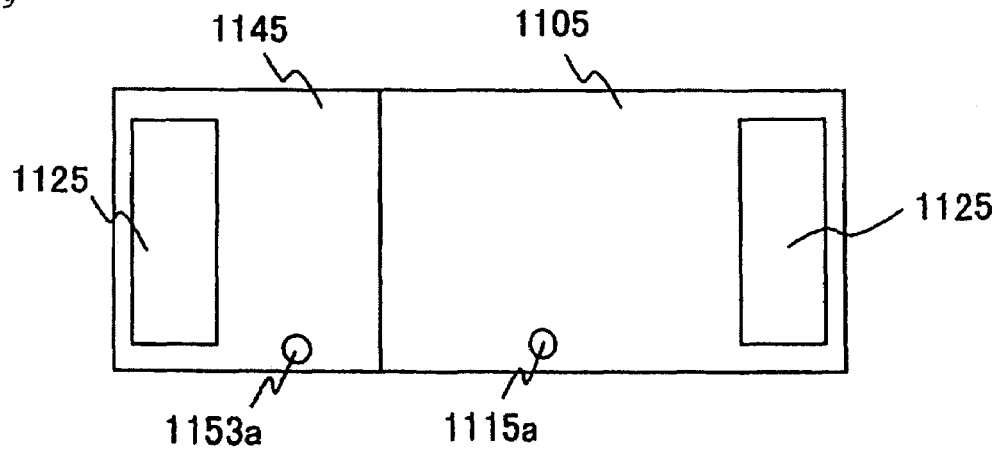
[FIG. 9] It is a cross-sectional showing view a structure of a fuel cartridge for the fuel cell shown in FIG. 8.

FIG. 9 is a cross-sectional view taken along line A-A' in FIG. 8. As shown in FIG. 9, low-concentration fuel tank 1145 is provided with low-concentration fuel inflow hole 1153a. Before low-concentration fuel tank 1145 is used, seal 1129 (not shown in FIG. 9) that covers low-concentration fuel inflow hole 1153a may be arranged in low-concentration fuel tank 1145, similarly to high-concentration fuel tank 1105.

Low-concentration fuel 1149 moves from low-concentration fuel tank 1145 through low-concentration fuel inflow pipe 1153 and flows into mixing tank 1143. Low-concentration fuel inflow pipe 1153 is provided with pump 1117 used to adjust the amount of flow of low-concentration fuel 1149. Further, high-concentration fuel 725 moves from high-concentration fuel tank 1105 through high-concentration fuel supply pipe 1115 and flows into mixing tank 1143, similarly to fuel cell 1101 in FIG. 1. High-concentration fuel inflow pipe 1115 is also provided with pump 1117.

According to the second embodiment, since the fuel concentration in mixing tank 1143 can be adjusted in accordance with the concentration of the recovered fuel, measured by concentration meter 1119, fuel 124 at a desired concentration can be stably supplied to fuel pole 102 of single cell structure 101 with greater reliability.

Incidentally, in the second embodiment, there is no limitation on the level of fuel concentration in low-concentration fuel 1149, and the level of fuel concentration can be appropriately selected within a range lower than the concentration of high-concentration fuel 725 in high-concentration fuel tank 1105. Also, water having no fuel component may be used. With this arrangement, the concentration of fuel 124 in mixing tank 1143 can be more efficiently adjusted.

Further, fuel cell 1141 may be provided with a control section for controlling the operations of pumps 1117 respectively arranged in fuel supply pipe 1111, high-concentration fuel supply pipe 1115, and low-concentration fuel inflow pipe 1153, in accordance with the fuel concentration measured by concentration meter 1119.

Also, in fuel cell 1141, low-concentration fuel 1149 is supplied from low-concentration fuel tank 1145 to mixing tank 1107, and therefore it is not necessary to provide fuel recovery pipe 1113. Since water generated at oxidizer pole 106 is not recovered through fuel recovery pipe 1113, a recovery mechanism, such as a condenser, for recovering the generated water is unnecessary. Therefore, the structure of fuel cell body 1151 can be simplified. It can be further suitably used as a fuel cell applied to, for example, a portable device.

Third Embodiment

In the above-mentioned fuel cell, the following arrangement may be used, instead of the arrangement in which the inflow port or the outflow port arranged in the respective tanks making up the fuel cartridge are covered by seal 1129. Hereinafter, explanations are given of the case of high-concentration fuel tank 1105 that is used in fuel cell 1101 in FIG. 1, however, this arrangement may be applied to the other tanks in the fuel cartridge.

Figure 10A:
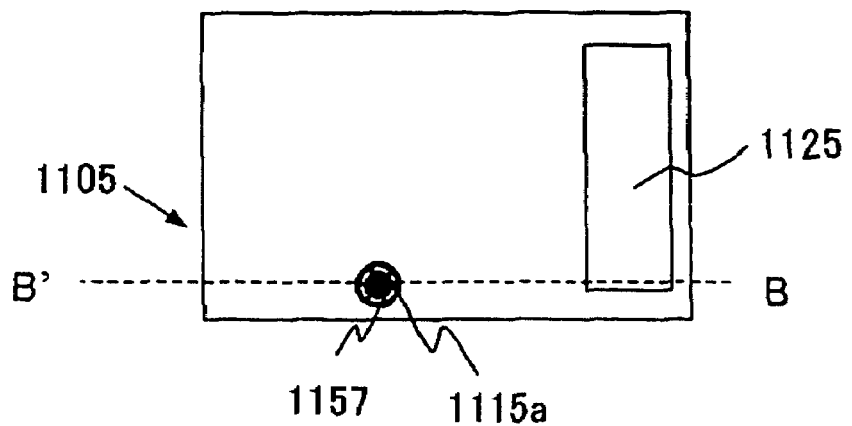
[FIG. 10A] It is a cross-sectional view showing a structure of a high-concentration fuel tank in a fuel cell according to a third embodiment of the present invention.
Figure 10B:
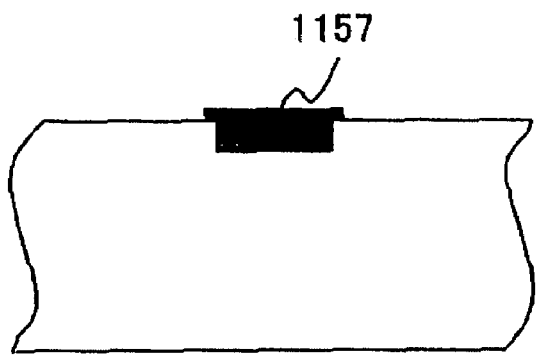
[FIG. 10B] It is a cross-sectional view showing the structure of the high-concentration fuel tank in the fuel cell according to the third embodiment of the present invention.

FIG. 10A is a view showing the arrangement of high-concentration fuel tank 1105 according to the third embodiment. FIG. 10B is a cross-sectional view taken along line B-B' near fuel inflow pipe connection hole 1115a in FIG. 10A. As shown in FIGS. 10A and 10B, seal member 1157 is arranged on the top and in the inside of fuel inflow pipe connection hole 1115a. Seal member 1157 is an elastic member with a self-sealing characteristic. As seal member 1157, for example, a septum or a reseal may be used. Preferably, seal member 1157 is made of materials that is resistant to high-concentration fuel 725 and can be hermetically sealed. As such a material, elastomer, like ethylene-propylene rubber and silicon rubber, may be used. When seal member 1157 is made of ethylene-propylene rubber, a copolymer of ethylene and propylene (EPM: ethylene-propylene copolymer) or a copolymer of ethylene, propylene and the third component (EPDM: ethylene-propylene diene terpolymer) may be used. Also, vulcanized rubber may be used as the seal member.

Figure 11:
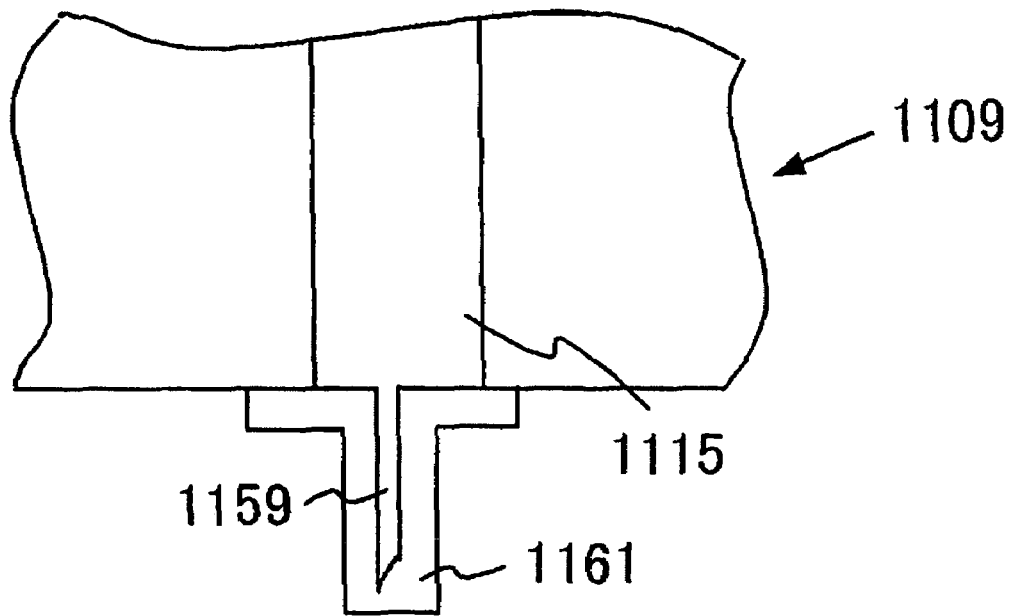
[FIG. 11] It is a cross-sectional view showing a structure of a fuel cell body in the fuel cell shown in FIG. 10.

FIG. 11 is a view showing the way in which fuel cell body 1109 can be connected to such a high-concentration fuel tank 1105. FIG. 11 is a view that is observed from the same direction and is enlarged near high-concentration fuel supply pipe 1115. Fuel cell body 1109 in FIG. 11 is provided with hollow needle 1159 connected to high-concentration fuel supply pipe 1115. Prior to use, hollow needle 1159 is protected by cover 1161.

Figure 12:
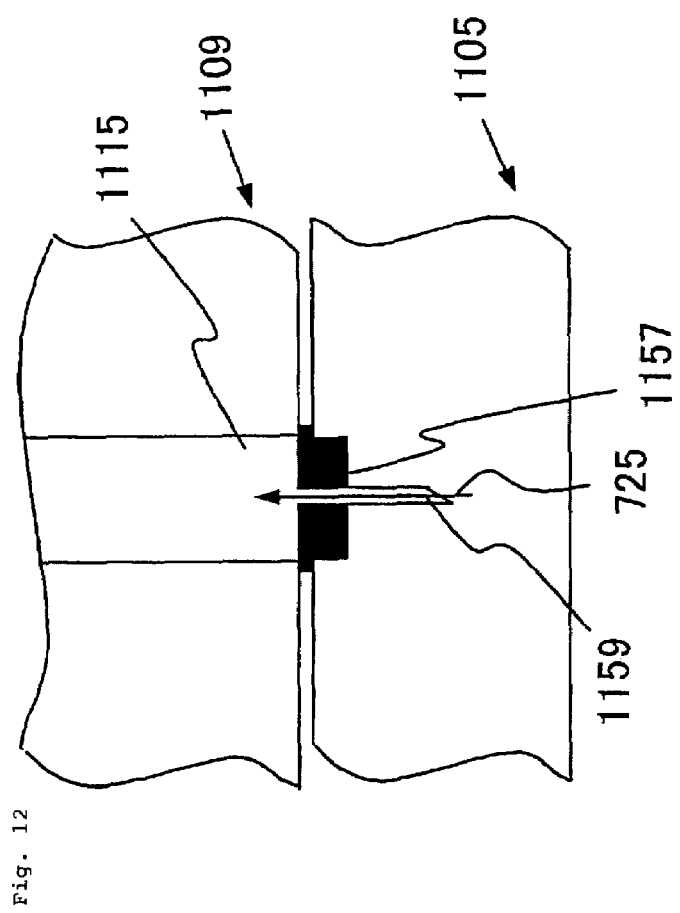
[FIG. 12] It is a view showing a state in which the high-concentration fuel tank shown in FIG. 10 is connected to the fuel cell body shown in FIG. 11.

FIG. 12 is a view showing a state in which high-concentration fuel tank 1105 in FIG. 10B is connected to fuel cell body 1109 in FIG. 11. When cover 1161 is removed and fuel cartridge 1103 is connected to fuel cell body 1109, hollow needle 1159 passes through seal member 1157 of high-concentration fuel tank 1105. With this operation, high-concentration fuel tank 1105 and high-concentration fuel supply pipe 1115 are connected through hollow needle 1159, and high-concentration fuel 725 can flow. At this time, seal member 1157 can prevent high-concentration fuel 725 from leaking. When fuel cartridge 1103 is removed from fuel cell body 1109, namely, hollow needle 1159 is removed from seal member 1157, the through hole formed by hollow needle 1159 is closed and the hermetical seal function is activated again (the reseal characteristic is provided). Since seal member 1157 is sealed again because of the reseal characteristic, the remaining contents of high-concentration fuel tank 1105, after use, can be prevented from leaking.

Incidentally, the above-mentioned arrangement can be used in fuel tanks except for the high-concentration fuel tank and each connection section of fuel cell body 1109 to which these tanks are attached.

Fourth Embodiment

In the above-explained fuel cartridge, tanks may be formed in cylindrical shapes. In this case, tanks may be connected, for example, as follows. Hereinafter, explanations are given in which the arrangement of fuel cartridge 1103 described in the first embodiment is taken as an example. FIGS. 13A, 13B, 13C and FIG. 14 are views showing structures of high-concentration fuel tank 1105 and mixing tank 1107 that make up fuel cartridge 1103. FIG. 13C is a cross-sectional view taken along line C-C'. In FIGS. 13A to 13C and FIG. 14, connection holes, such as fuel outflow pipe connection hole 1111a, are not shown.

Figure 13A:
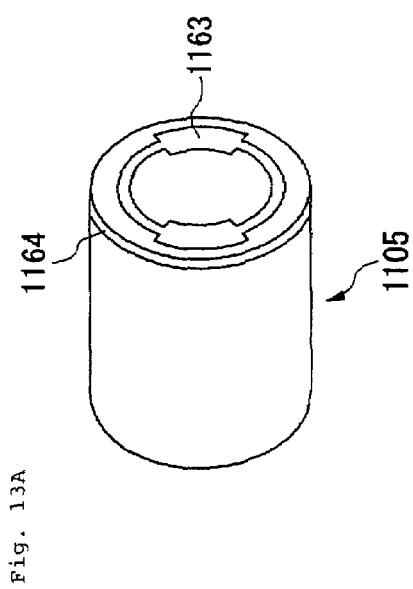
[FIG. 13A] It is a view showing a structure of a high-concentration fuel tank in a fuel cell according to a fourth embodiment of the present invention.

As shown in FIG. 13A, high-concentration fuel tank 1105 is provided with connection section 1164 at one end. Connection section 1164 is hollow and is provided with connection hole 1163 in a ring shape. Connection hole 1163 is provided with two broad areas, and the other areas are narrow.

Figure 13B:
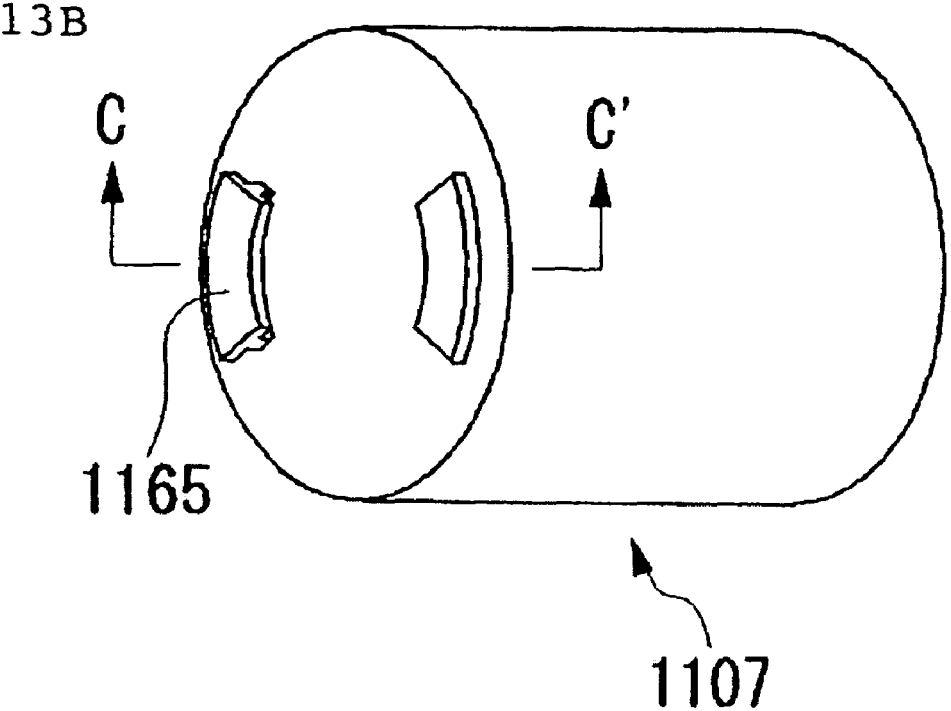
[FIG. 13B] It is a view showing a structure of a mixing tank in the fuel cell according to the fourth embodiment of the present invention.
Figure 13C:
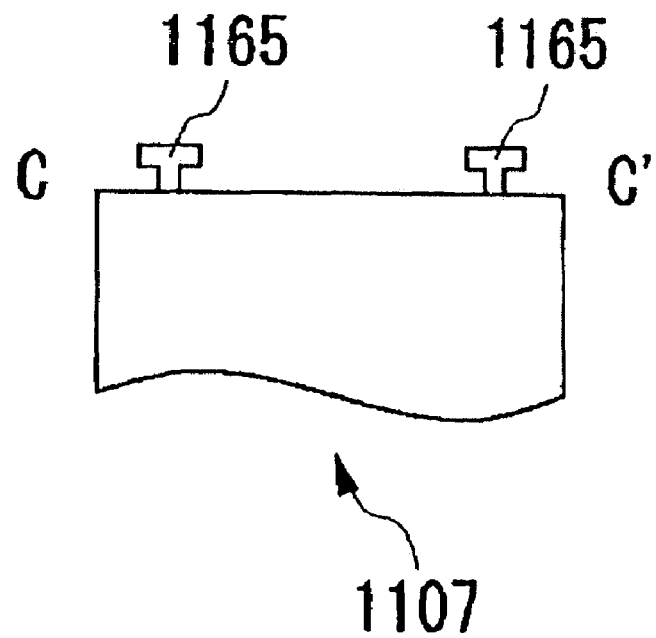
[FIG. 13C] It is a view showing the structure of the mixing tank in the fuel cell according to the fourth embodiment of the present invention.

As shown in FIGS. 13B and 13C, mixing tank 1107 is provided with two projection sections 1165 on one end surface. Projection section 1165 is T-shaped in the cross section view, and is positioned and made in a size to be inserted into connection hole 1163 when high-concentration fuel tank 1105 and mixing tank 1107 are opposite each other.

Figure 14:
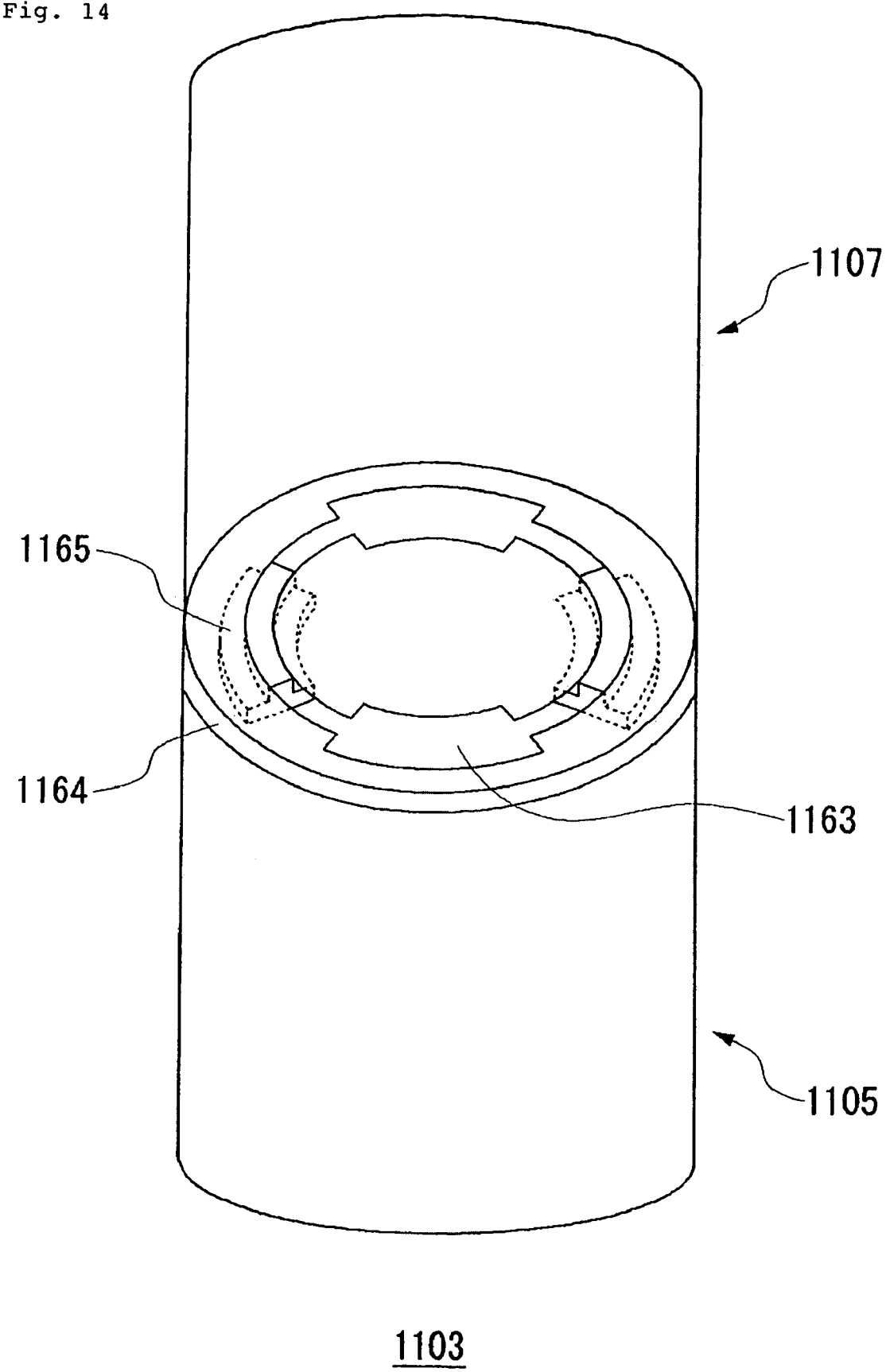
[FIG. 14] It is a view showing the structure of the high-concentration fuel tank and the mixing tank in the fuel cell shown in FIG. 13.

FIG. 14 is a view showing a state in which high-concentration fuel tank and mixing tank 1107 are linked. As shown in FIG. 14, projection sections 1165 of mixing tank 1107 are inserted into the broad areas of connection hole 1163, and one of tanks 1105, 1107 is rotated around the central axis of the cylinder relative to the other tank, whereby the narrow areas of projection section 1165 slide in the narrow areas of connection section 1164. By fixing them in this state, high-concentration fuel tank 1105 and mixing tank 1107 are linked.

Figure 15A:
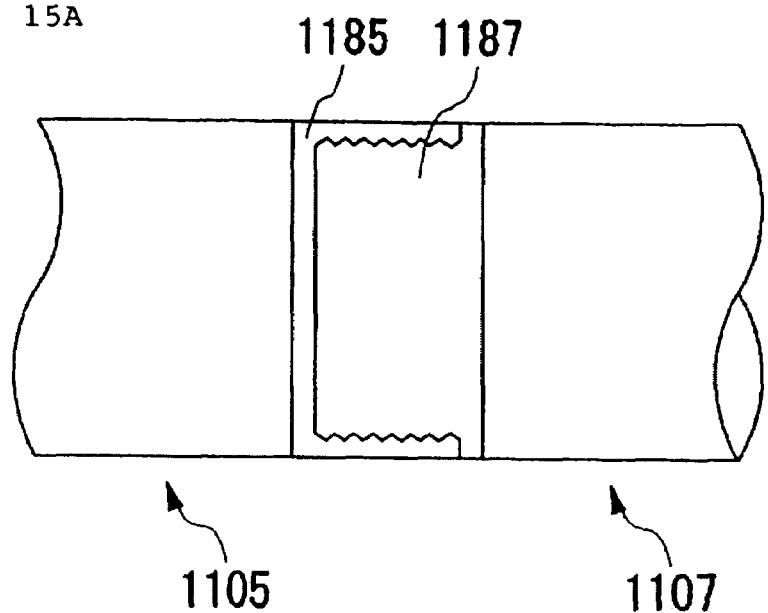
[FIG. 15A] It is a cross-sectional view showing a structure of a modified example of the high-concentration fuel tank and the mixing tank in the fuel cell according to the fourth embodiment of the present invention.
Figure 15B:
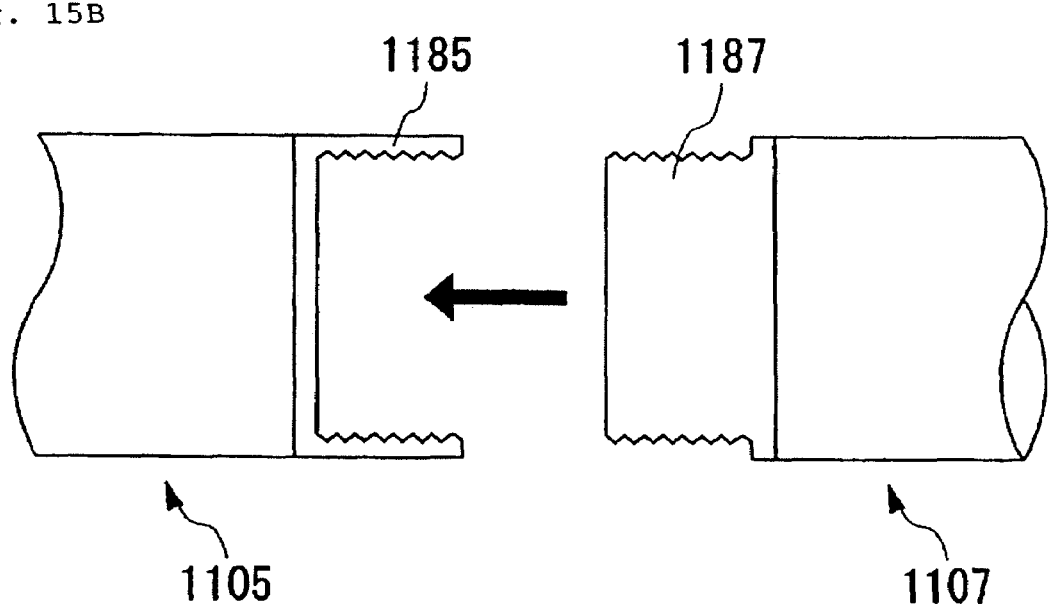
[FIG. 15B] It is a cross-sectional view showing the structure of the modified example of the high-concentration fuel tank and the mixing tank in the fuel cell according to the fourth embodiment of the present invention.

Also, FIGS. 15A and 15B are views showing another method for connecting high-concentration fuel tank 1105 and mixing tank 1107. FIG. 15A is a view showing the state in which high-concentration fuel tank 1105 and mixing tank 1107 are connected, and FIG. 15B is a view showing the state prior to connection. In FIGS. 15A and 15B, connection holes, like fuel outflow pipe connection hole 1111a, are not shown.

As shown in FIGS. 15A and 15B, high-concentration fuel tank 1105 is provided with connection section 1185. On the internal wall of connection section 1185, an internal thread section is formed. Also, mixing tank 1107 is provided with connection section 1187, and an external thread section is formed on the external wall of connection section 1187. The thread sections of connection section 1185 and connection section 1187 are linked, and thereby linking high-concentration fuel tank 1105 and mixing tank 1107.

In the mechanism connecting the high-concentration fuel tank and mixing tank, as described above, the connection relationship between the high-concentration fuel tank and the mixing tank may be reversed, i.e., high-concentration fuel tank 1105 may be provided with an external thread section and the mixing tank may be provided with an internal thread section.

With the above-described arrangement, high-concentration fuel tank 1105 and mixing tank 1107 can be linked simply. Also, they can be fixed while being linked.

Fifth Embodiment

The fifth embodiment relates to another method of detecting the remaining amount of liquid in the fuel tank of the fuel cartridge for the above-explained fuel cell. Hereinafter, explanations are given of a case in which the liquid surface of high-concentration fuel 725 in high-concentration tank 1105 of fuel cell 1101 in FIG. 1 is detected, however, the arrangement of the fifth embodiment can be applied to detecting the level of the liquid surface of liquid in another tank.

In the fifth embodiment, the liquid surface of high-concentration fuel 725 is detected by a liquid surface level sensor of a magnet float type. A magnetic sensor is arranged in high-concentration fuel tank 1105. The magnetic sensor, for example, is provided with a bottomed pipe body in which a plurality of magnetic-electric converting elements and resistors connected in parallel is arranged at predetermined intervals in a direction in which the liquid surface moves. Also, a float to which a magnet is fixed is fitted to the periphery of the bottomed pipe body to be movable up and down. Magnetic-electric converting elements are arranged in a manner that the elements near the float position operate to repeatedly make switch on and off, as the float moves according to changes the level of the liquid surface. When the magnet moves up and down together with the float, terminals of a lead switch are made contact and noncontact each other. At this time, the lead switch near the float is closed. In accordance with the position of the closed lead switch, the resistance value between terminals varies, and thus the voltage between the terminals varies. The change in the voltage is detected by a detector connected to the magnetic sensor, thereby detecting the level of the liquid surface.

Figure 16:
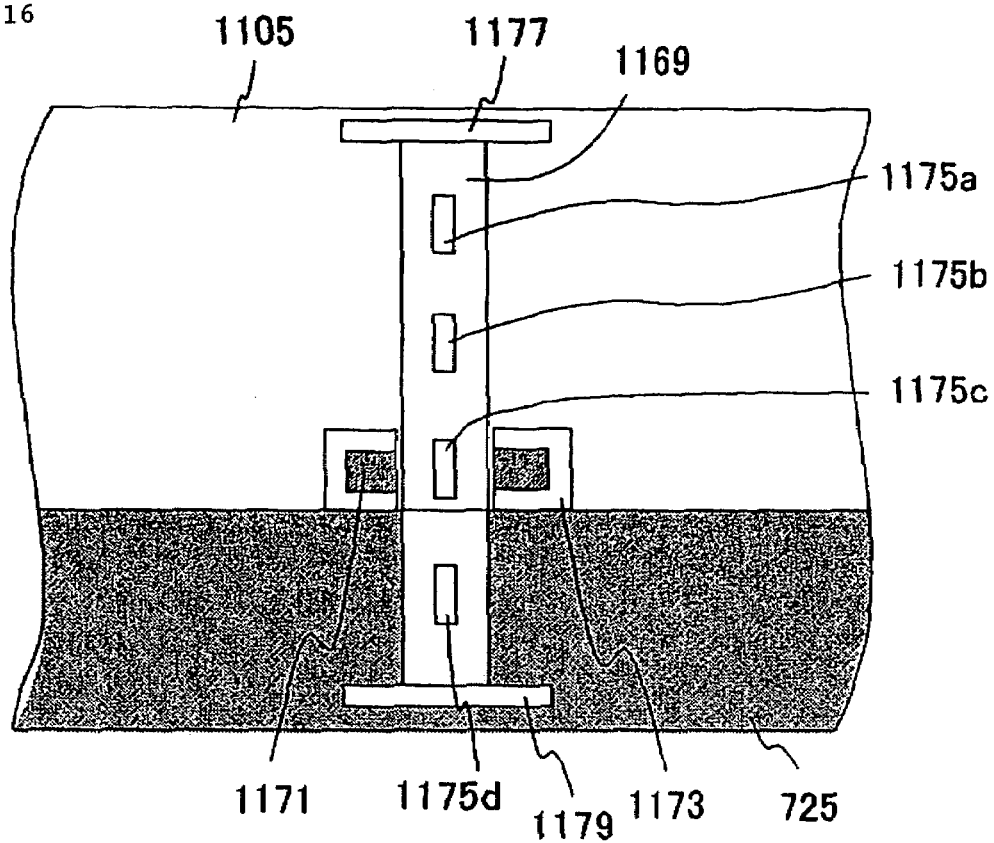
[FIG. 16] It is a view schematically showing a structure of a magnetic sensor in a fuel cell according to a fifth embodiment of the present invention.

FIG. 16 is a view schematically showing the structure of magnetic sensor 1167. Magnetic sensor 1167 is provided with cylindrical float guide 1169 and float 1173 in which magnet 1171 is arranged. Stopper 1177 and stopper 1179 are arranged at the top and the bottom of float guide 1169. Also, a plurality of lead switches 1175a to 1175d is arranged along the central axis direction of the cylinder inside float guide 1169. Lead switches 1175a to 1175d are connected to a circuit substrate (not shown) through lead lines (not shown) in parallel, and resistors (not shown) are arranged between respective lead switches. The lead lines (not shown) of magnetic sensor 1167 are connected to a detection section (not shown) for detecting the level of the liquid surface so as to detect opening-closing of the lead switches.

Magnet 1171 installed in float 1173 moves up and down along float guide 1169 in accordance with the variation in the level of the liquid surface of high-concentration fuel 725. Magnet 1171 moves up and down, and thus some of lead switches 1175a to 175d is opened or closed. For example, in FIG. 16, lead switch 1175c is closed and the other lead switches are opened. As float 1173 moves, the position of the lead switch which is closed by the magnetic field generated near magnet 1171 varies, the voltage detected by the detection section varies, and the voltage is detected, thereby detecting the level of the liquid surface.

Incidentally, in the fifth embodiment, the detection section may be connected to an analysis section, and the analysis section may be connected to a reference data storage section for analyzing the level of the liquid surface. In the reference data storage section, for example, data of the voltage value detected by the detection section and the level (height) of the liquid surface which correspond to each other can be stored. With this arrangement, the analysis section can reliably calculate the level of the liquid surface by using the voltage value detected by the detection section.

Incidentally, in the arrangement of the fifth embodiment, when opening-closing of each lead switch is detected on the fuel cell body side, liquid surface meter 1121 of fuel cell body 1109 or fuel cell 1101 corresponds to a detection mechanism. Also, the tank may have no liquid indication window 1125.

According to the fifth embodiment, the remaining amount of liquid in the tank making up fuel cartridge 1103 can be reliably detected. Therefore, tanks can be exchanged at good timing.

Incidentally, in the arrangement in FIG. 16, the strength of the magnetic field is detected at the height where each lead switch is positioned, by using the plurality of lead switches, whereby the liquid surface is detected. However, magnetic sensor 1167 may be configured by using an element other than the lead switch, to the extent that a magnetic signal of float 1173 can be converted into an electric signal. For example, a hall sensor may be used instead of the lead switch. The detection section for detecting opening-closing of the lead switch in accordance with upward and downward movement of float 1173 may be arranged in fuel cell body 1109 or may be arranged in high-concentration fuel tank 1105.

Sixth Embodiment

In the above-explained fuel cell, a sensor that uses variations in resonance frequency characteristics according to the volume of the vacant space in the tank may be used in order to detect the level of the liquid surface of the tank in fuel cartridge 1103.

Figure 17:
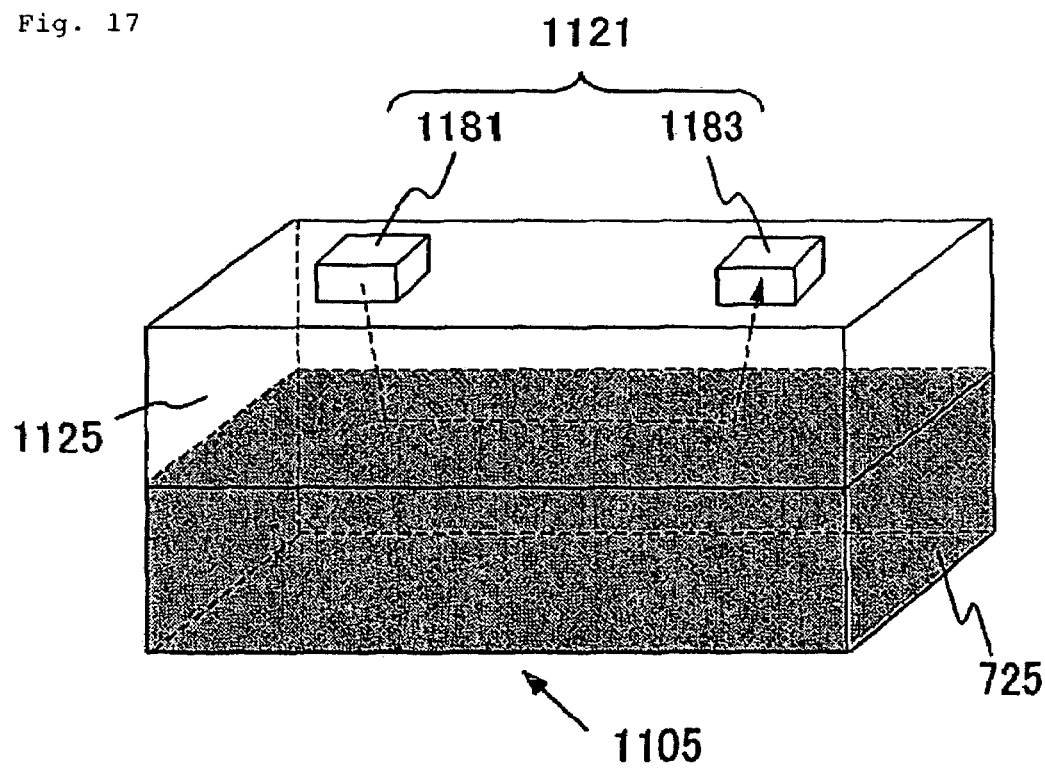
[FIG. 17] It is a view for explaining a method of detecting a liquid surface of high-concentration fuel in a high-concentration fuel tank in a fuel cell according to a sixth embodiment of the present invention.

FIG. 17 is a view for explaining the method of detecting the level of the liquid surface of high-concentration fuel 725 in high-concentration fuel tank 1105. Liquid surface meter 1121 in the fuel cell has oscillation section 1181 and receiving section 1183. As oscillation section 1181 and receiving section 1183, for example, vibrators made of piezoelectric elements may be used. Also, receiving section 1183 is connected to a conversion section (not shown) for converting vibrations into an electric signal, and the conversion section is connected to an analysis section (not shown) for calculating the height of the liquid surface by using the electric signal obtained in the conversion section.

The volume of the vacant space in high-concentration fuel tank 1105 is changed in accordance with the height of the liquid surface of high-concentration fuel 725. Accordingly, when a sound wave or the like is introduced into the tank while the oscillation frequency is changed, the resonance frequency of the standing wave generated in the liquid surface is changed. Then, receiving section 1183 detects this resonance frequency. The resonance frequency detected by receiving section 1183 is converted into an electric signal by the conversion section, and the height of the liquid surface is calculated by using the obtained electric signal in the analysis section. With this arrangement, the level of the liquid surface of high-concentration fuel 725 can be detected based on change of resonance frequency.

Incidentally, in the sixth embodiment, the analysis section may be connected to the reference data storage section for analyzing the level of the liquid surface, similar to the fifth embodiment. In the reference data storage section, for example, data of the voltage value detected by the detection section and the level of the liquid surface which correspond to each other can be stored.

Seventh Embodiment

In the above-explained fuel cell, each of the colors of liquids stored in tanks making up fuel cartridge 1103 may be made different. For example, in the case of fuel cell 1101 in FIG. 1, the color of high-concentration fuel 725 in high-concentration fuel tank 1105 can be made different from the color of low-concentration fuel 1149 in mixing tank 1107. Also, in the case of fuel cell 1141 in FIG. 8, the color of high-concentration fuel 725 in high-concentration fuel tank 1105 can be made different from the color of low-concentration fuel 1149 in low-concentration fuel tank 1145. A combination of different colors can be selected, as appropriate. For example, high-concentration fuel 725 may be blue and low-concentration fuel 1149 may be yellow.

The colors of liquids in the respective fuel tanks making up fuel cartridge 1103 are made different, and therefore, when the user of the fuel cell uses each fuel tank, the user can visually confirm the color of the liquid. Therefore, tanks can be reliably exchanged without making a mistake in the kind of tank. Accordingly, the fuel cell can be used with greater safely.

Further, the color of each fuel tank is made different, and therefore color detection can be used to detect the liquid surface. In this case, preferably, the light is irradiated in parallel to line A-A' in FIGS. 1 and 8. Hereinafter, explanations are given of a case in which the liquid surface measuring method of the seventh embodiment is applied to fuel cell 1141 in FIG. 8, as an example, however, this arrangement may be applied to fuel cell 1101 in FIG. 1.

Figure 18:
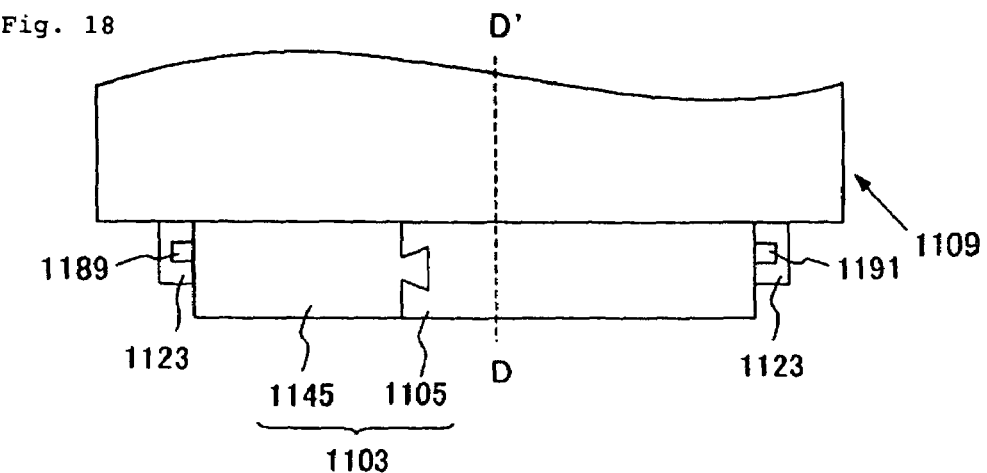
[FIG. 18] It is a view showing a structure of a fuel cell according to a seventh embodiment of the present invention.

FIG. 18 is a view showing a structure of a fuel cell according to the seventh embodiment. FIG. 18 does not show a pipe connecting to fuel cartridge 1103. In this fuel cell, light source 1189 is arranged near the end face of low-concentration fuel tank 1145 and light receiving section 1191 is arranged near the end face of high-concentration fuel tank 1105, at connector 1123 in fuel cell body 1109. Incidentally, light source 1189 and light receiving section 1191 may be arranged inversely.

Figure 19:
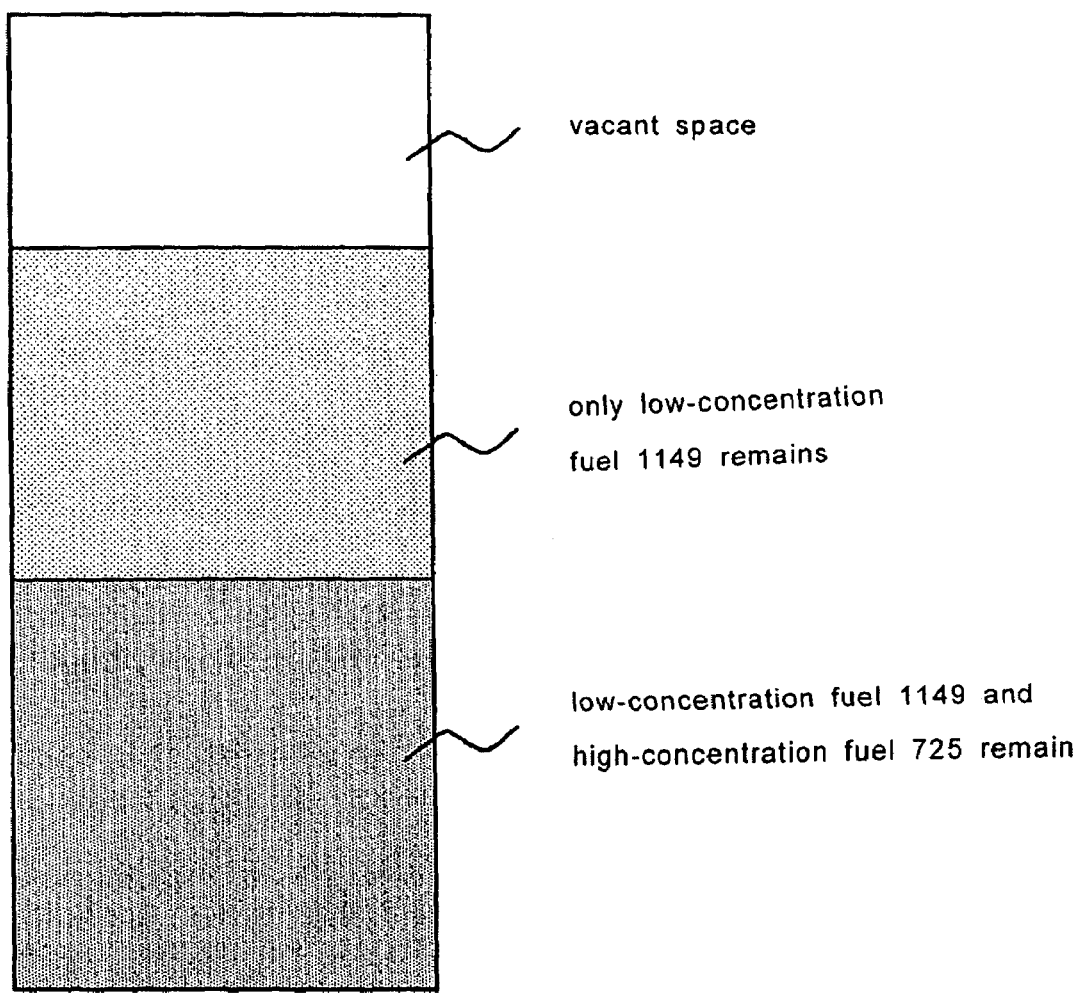
[FIG. 19] It is a cross-sectional view taken along a line D-D' shown in FIG. 18.

FIG. 19 is a cross-sectional view taken along line D-D' in FIG. 18. In FIG. 19, a case is shown as an example, in which the liquid surface of high-concentration fuel 725 in high-concentration fuel tank 1105 is lower than the liquid surface of lower-concentration fuel 1149 in lower-concentration fuel tank 1145. In the cross section of the tank shown in FIG. 19, there are an area where neither low-concentration fuel 1149 nor high-concentration fuel 725 remains (vacant space), an area where only low-concentration fuel 1149 remains, and an area where both low-concentration fuel 1149 and high-concentration fuel 725 remain. The area where only low-concentration fuel 1149 remains is colored with the color of low-concentration fuel 1149. Also, the area where both low-concentration fuel 1149 and high-concentration fuel 725 remain is colored with the mixed color of these fuels.

Irradiated light from light source 1189 is scanned up and down in FIG. 19, colors are detected by light receiving section 1191 and, as a result, position of border of each area which is colored with each color is detected in up and down direction in FIG. 19. Therefore, the liquid surfaces of low-concentration fuel 1149 and high-concentration fuel 725 can be detected with the obtained color pattern.

According to this arrangement, the remaining amount of fuel in each tank making up fuel cartridge 1103 can be detected easily with this simple method.

As described above, the present invention is explained in accordance with the embodiments. These embodiments are examples, and a person skilled in the art should understand that combinations of each element or each process can be variously modified and that such a modified example is within the scope of the invention.

For example, in the above embodiments, explanations are given of the case in which fuel cartridge 1103 is provided with two tanks, however, there is no limitation on fuel cartridge 1103 having two tanks as long as a plurality of tanks is included.

Also, there is no limitation on the above method of detecting the level of the liquid surface of liquid in the tank of fuel cartridge 1103. For example, a sensor using capacitance or an ultrasonic sensor may be used.

The invention claimed is:
1. A fuel cartridge for a fuel cell, comprising:
a first chamber for retaining a first liquid fuel, said first liquid fuel being a high-concentration liquid fuel;
a second chamber for retaining a second liquid fuel, said second liquid fuel being a low-concentration liquid fuel, said second chamber being a fuel mixing tank for mixing said first liquid fuel and said second liquid fuel;
a partition wall for partitioning said first chamber and said second chamber; and
a mounting section to be fixed to a fuel cell body,
wherein said second chamber is provided with a fuel outlet port through which said second liquid fuel passes to said fuel cell body, and is provided with a fuel inlet port to which said first liquid fuel is introduced from said first chamber, and
said first chamber and said second chamber are detachably connected at a fitting section such that said fuel cartridge is removably mountable to said fuel cell body while said first chamber and said second chamber are linked.

2. The fuel cartridge for the fuel cell according to claim 1, wherein said second chamber further comprises a fuel recovery pipe connection hole through which said second chamber receives fuel from said fuel cell body.

3. The fuel cartridge for the fuel cell according to claim 1, wherein said fuel outlet port is further arranged in said first chamber, and said first liquid fuel passes through said fuel outlet port arranged in said first chamber.

4. The fuel cartridge for the fuel cell according to claim 1, wherein said first liquid fuel and said second liquid fuel are different in color.

5. The fuel cartridge for the fuel cell according to claim 1, further comprising a first container having said first chamber and a second container having said second chamber and constructed so as to be removably mounted to said first container.

6. The fuel cartridge for the fuel cell according to claim 1, further comprising a cover member for covering said fuel outlet port, wherein said cover member is formed into a removable sheet.

7. The fuel cartridge for the fuel cell according to claim 1, further comprising a cover member for covering said fuel outlet port, wherein said cover member is an elastic member with a self-sealing characteristic.

8. The fuel cartridge for the fuel cell according to claim 1, wherein a detection window for detecting the liquid surface of said first liquid fuel or a liquid surface of said second liquid fuel from the outside is arranged in said first chamber or in said second chamber.

9. The fuel cartridge for the fuel cell according to claim 8, wherein said detection window is constructed to allow light coming from said fuel cell body to pass through said detection window.

10. The fuel cartridge for the fuel cell according to claim 1, wherein a liquid surface indication member for indicating the level of a liquid surface of said first liquid fuel or the level of a liquid surface of said second liquid fuel is arranged in said first chamber or in said second chamber.

11. The fuel cartridge for the fuel cell according to claim 10, wherein said liquid surface indication member comprises a float that floats on said first liquid fuel or on said second liquid fuel.

12. A fuel cell comprising a fuel cell body having a fuel pole and the fuel cartridge for the fuel cell according to claim 1 which contains liquid fuel to be supplied to said fuel pole.

13. The fuel cell according to claim 12, wherein a liquid mixing tank for mixing said first liquid fuel and said second liquid fuel is arranged in said fuel cell body.

14. The fuel cell according to claim 12, wherein a measurement section for measuring the level of a liquid surface of said first liquid fuel or the level of a liquid surface of said second liquid fuel is arranged in said fuel cell body.

15. The fuel cartridge for the fuel cell according to claim 2, wherein said first liquid fuel and said second liquid fuel are different in color.

16. The fuel cartridge for the fuel cell according to claim 3, wherein said first liquid fuel and said second liquid fuel are different in color.

17. The fuel cartridge for the fuel cell according to claim 2, wherein a concentration meter measures a concentration of the second liquid fuel in the fuel recovery pipe.

18. The fuel cartridge for the fuel cell according to claim 1, further comprising a connector having a support section formed in a convex shape on a surface which contacts the fuel cartridge.

19. The fuel cartridge for the fuel cell according to claim 18, wherein a groove section in a shape corresponding to the support section is arranged at a side surface of the fuel cartridge.

20. The fuel cartridge for the fuel cell according to claim 19, wherein the groove section of the fuel cartridge is fitted to the support section of the connector and is configured to slide relative to the connector, thereby attaching the fuel cartridge to the fuel cell body.

* * * * *